(12) United States Patent
Matsumoto et al.

(10) Patent No.: US 7,985,915 B2
(45) Date of Patent: Jul. 26, 2011

(54) MUSICAL PIECE MATCHING JUDGING DEVICE, MUSICAL PIECE RECORDING DEVICE, MUSICAL PIECE MATCHING JUDGING METHOD, MUSICAL PIECE RECORDING METHOD, MUSICAL PIECE MATCHING JUDGING PROGRAM, AND MUSICAL PIECE RECORDING PROGRAM

(75) Inventors: Satoru Matsumoto, Izumi (JP); Yuji Yamamoto, Yawata (JP); Tatsuo Koga, Daito (JP); Ryosuke Ohtsuki, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 449 days.

(21) Appl. No.: 12/029,643

(22) Filed: Feb. 12, 2008

(65) Prior Publication Data

US 2009/0044688 A1 Feb. 19, 2009

(30) Foreign Application Priority Data

Aug. 13, 2007 (JP) ................................. 2007-210839

(51) Int. Cl.
*G10H 1/00* (2006.01)
(52) U.S. Cl. ................. 84/616; 84/601; 84/603; 84/604; 84/609
(58) Field of Classification Search .................... None
See application file for complete search history.

(56) References Cited

U.S. PATENT DOCUMENTS

| | | | | |
|---|---|---|---|---|
| 6,140,568 | A * | 10/2000 | Kohler | 84/616 |
| 6,951,977 | B1* | 10/2005 | Streitenberger et al. | 84/626 |
| 6,967,275 | B2* | 11/2005 | Ozick | 84/616 |
| 7,026,536 | B2* | 4/2006 | Lu et al. | 84/612 |
| 7,041,892 | B2* | 5/2006 | Becker | 84/603 |
| 7,132,595 | B2* | 11/2006 | Lu et al. | 84/612 |
| 7,183,479 | B2* | 2/2007 | Lu et al. | 84/612 |
| 7,323,631 | B2* | 1/2008 | Miyaki et al. | 84/616 |
| 7,427,711 | B2* | 9/2008 | O'Modhrain et al. | 84/742 |
| 7,518,053 | B1* | 4/2009 | Jochelson et al. | 84/609 |
| 2002/0120456 | A1 | 8/2002 | Berg et al. | |
| 2003/0233930 | A1* | 12/2003 | Ozick | 84/610 |
| 2004/0069123 | A1* | 4/2004 | Becker et al. | 84/612 |
| 2005/0211072 | A1* | 9/2005 | Lu et al. | 84/612 |
| 2006/0048634 | A1* | 3/2006 | Lu et al. | 84/612 |
| 2008/0156177 | A1* | 7/2008 | Iketani et al. | 84/609 |

FOREIGN PATENT DOCUMENTS

| | | |
|---|---|---|
| JP | 2004-537760 | 12/2004 |
| JP | 2005-522057 A | 7/2005 |

* cited by examiner

*Primary Examiner* — Marlon T Fletcher
(74) *Attorney, Agent, or Firm* — Marvin A. Motsenbocker; Mots Law, PLLC

(57) ABSTRACT

Characteristic amounts are calculated from each of multiple musical piece contents, and then time points when the characteristic amounts exceed a threshold are detected as cut points. Information on the cut point concerning each of the multiple musical piece contents is stored. Based on the stored information on the cut point, a judgment is made as to whether the multiple musical piece contents match each other.

9 Claims, 21 Drawing Sheets

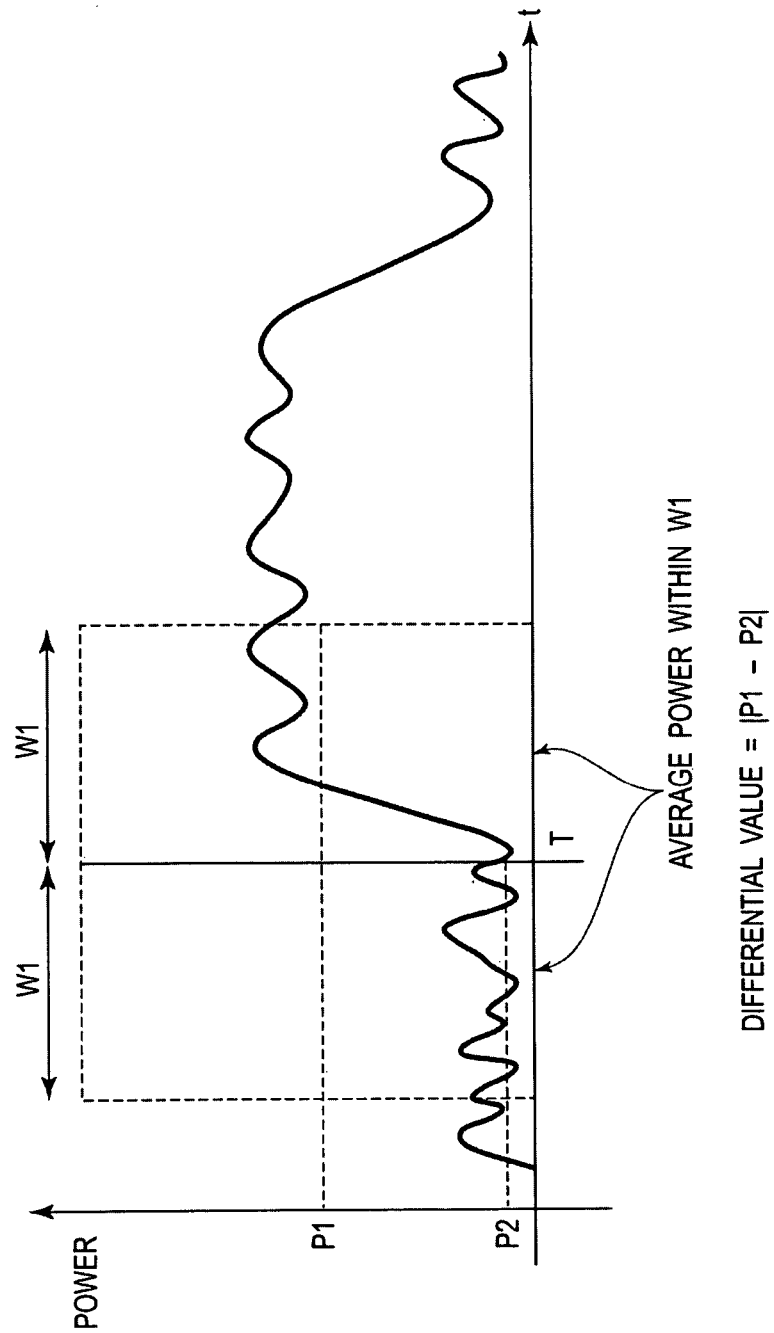

CUT POINT COUNT INFORMATION

| MUSICAL PIECE CONTENT IDENTIFIER | CUT POINT COUNT |
|---|---|
| MUSICAL PIECE CONTENT #1 | 16 |
| MUSICAL PIECE CONTENT #2 | 23 |
| MUSICAL PIECE CONTENT #3 | 16 |
| ... | ... |

CUT POINT TIME INFORMATION

MUSICAL PIECE CONTENT #3
MUSICAL PIECE CONTENT #2
MUSICAL PIECE CONTENT #1
CUT POINT #1  00:01:00
CUT POINT #2  01:02:30
CUT POINT #3  03:04:50

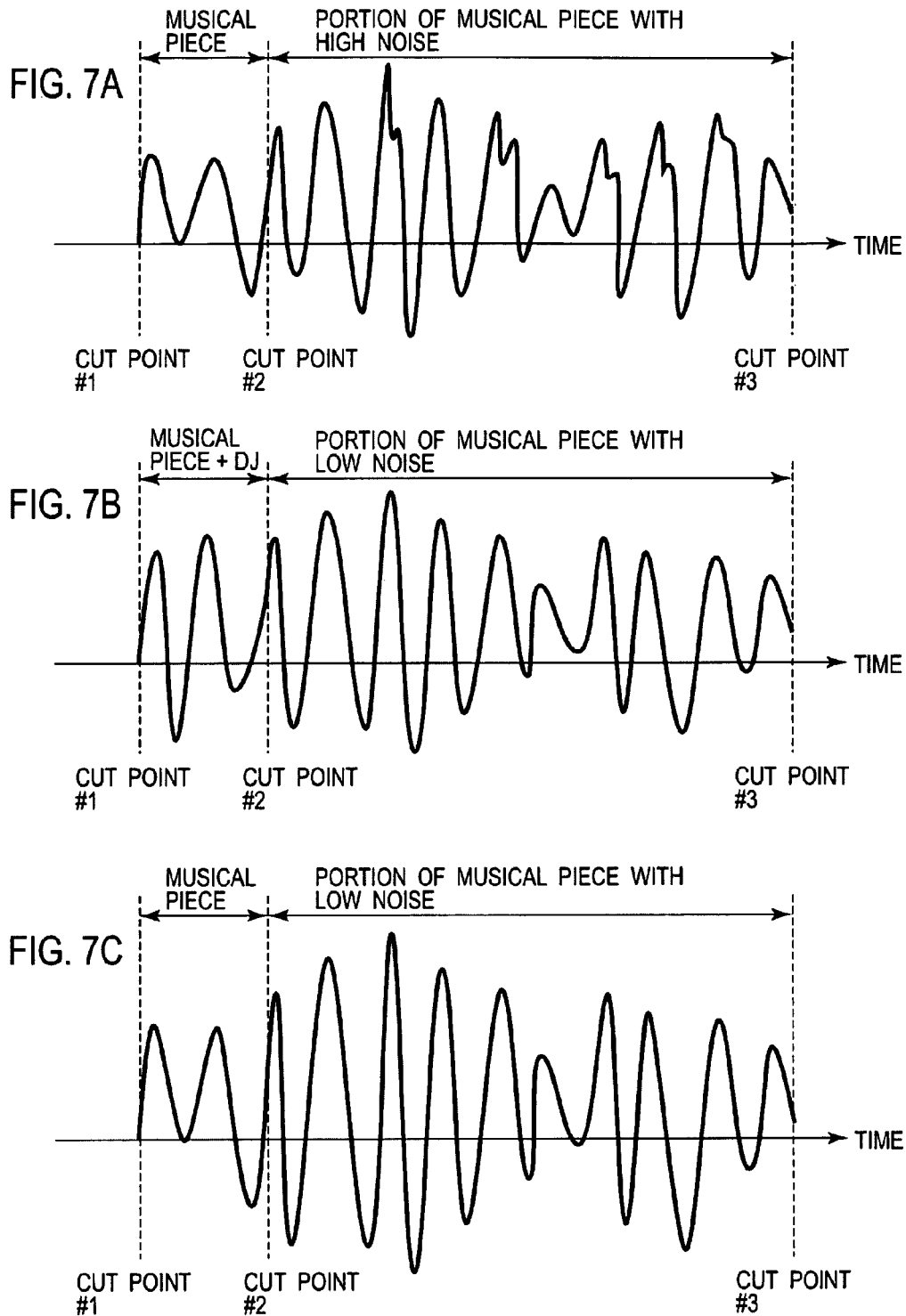

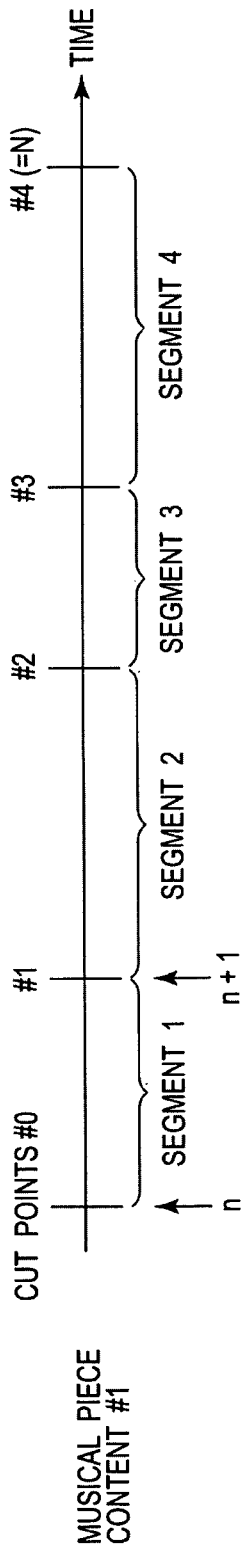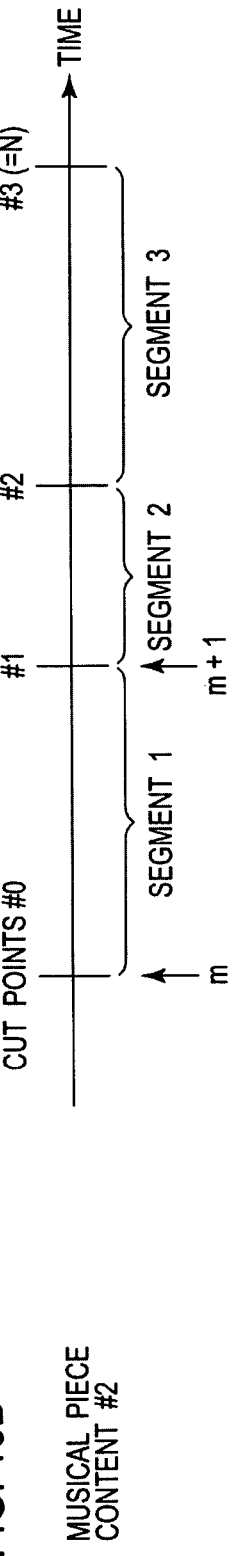

MUSICAL PIECE MATCHING JUDGING DEVICE, MUSICAL PIECE RECORDING DEVICE, MUSICAL PIECE MATCHING JUDGING METHOD, MUSICAL PIECE RECORDING METHOD, MUSICAL PIECE MATCHING JUDGING PROGRAM, AND MUSICAL PIECE RECORDING PROGRAM

CROSS REFERENCE TO RELATED APPLICATIONS

This application claims priority based on 35 USC 119 from prior Japanese Patent Application No. P2006-221138 filed on Aug. 14, 2006 and Japanese Patent Application No. P2007-210839 filed on Aug. 13, 2007; the entire contents of which are incorporated herein by reference.

BACKGROUND OF THE INVENTION

1. Field of the Invention

The present invention relates to a musical piece content processing technique, and more specifically, to a musical piece matching judging device, a musical piece recording device, a musical piece matching judging method, a musical piece recording method, a musical piece matching judging program, and a musical piece recording program, which are capable of judging if multiple musical piece contents match each other.

2. Description of Related Art

There is a known musical piece recording device that receives television broadcast, radio broadcast or the like, and to collect (record) musical piece contents automatically. Meanwhile, there is also known another known musical piece recording device that acquires musical piece contents from a recording medium such as a CD (compact disc), and to acquire musical piece contents also from a distribution server that distributes musical piece contents through a communication network in addition to acquiring musical piece contents from television broadcast or radio broadcast.

In such musical piece recording devices, multiple contents of the same musical piece may be recorded without being noticed by a user, and a storage capacity of a musical piece content recording unit such as a hard disk drive (HDD) may be wasted as a consequence.

If recorded musical piece contents include musical piece information, the contents of the same musical piece can be searched for by use of the musical piece information, and then unnecessary (low-quality) musical piece contents can be deleted. However, if the recorded musical piece contents do not include the musical piece information, a user has to play back the recorded musical piece contents and to actually listen to the musical piece contents one by one in order to search for the contents of the same musical piece.

In the meantime, as a technique for automatically searching for contents of the same musical piece, there is a known technique of searching for contents of the same musical piece by executing matching computation of the respective audio waveforms of musical piece contents. Such a method to search for contents of the same musical piece is disclosed, for example, in Japanese Patent Translation Publication No. 2004-537760.

However, execution of the matching computation of the audio waveforms requires a complicated operation, and therefore poses a problem of an increase in a processing burden on a central processing unit (CPU) and the like. Moreover, when multiple musical piece contents are recorded in a compression-coded state, it is necessary to decode each of the musical piece contents in order to execute the matching computation of the audio waveforms, which leads to a further increase in the amount of operation.

SUMMARY OF THE INVENTION

An aspect of the invention provides a musical piece matching judging device that comprises a cut point detector, a cut point information storage unit, and a matching judging unit. The cut point detector calculates characteristic amounts respectively from multiple musical piece contents, and detects, as cut points, time points when the characteristic amounts exceed a threshold. The cut point information storage unit stores information on the cut point concerning each of the multiple musical piece contents. The matching judging unit judges whether the multiple musical piece contents match each other, based on the stored information on the cut point.

Here, the "musical piece contents" mean the contents including music (musical pieces). According to this aspect, the time point in each musical piece having a large change in the characteristic amount is stored as the cut point. Then, it is judged whether the musical pieces match based on the information on the cut points. In this way, it is possible to execute matching judgment of the musical pieces with a small amount of operation.

In the musical piece matching judging device according to the first aspect, the cut point detector is preferably configured to calculate an amount of change per unit time of either power or a frequency of an audio signal as the characteristic amount. The "power of the audio signal" may be obtained by calculating an amplitude spectrum from the audio signal by means of Fourier transform or the like, and then by finding a square sum of this amplitude spectrum, for example.

Since the amount of change per unit time of either the power or the frequency of the audio signal is calculated from the musical piece content as the characteristic amount, it is possible to obtain the preferable characteristic amount from the musical piece content and thereby to detect the accurate cut point.

It is preferable that the matching judging unit judges, based on the number of the cut points of each of the musical piece contents, whether the plurality of musical piece contents match each other.

As the matching judging unit judges, based on the number of the cut points of each of the musical piece contents, whether the multiple musical piece contents match each other, it is possible to execute matching judgment of the musical pieces easily, and thereby to reduce the amount of operation.

It is preferable that the matching judging unit judges, based on time intervals between the cut points of each of the musical piece contents, whether the plurality of musical piece contents match each other.

As the matching judging unit judges, based on time intervals between the cut points of each the musical piece contents, whether the multiple musical piece contents match each other, it is possible to execute matching judgment of the musical pieces easily, and thereby to reduce the amount of operation.

Another aspect of the invention provides a musical piece recording device that comprises a first acquiring unit configured to acquire a musical piece content, a second acquiring unit configured to acquire a musical piece content having higher quality than the musical piece content acquired by the first acquiring unit, a musical piece content storage unit configured to store the musical piece content acquired by the first acquiring unit and the musical piece content acquired by the second acquiring unit, an identification information attaching unit configured to attach first identification information to the musical piece content acquired by the first acquiring unit, and to attach second identification information to the musical piece content acquired by the second acquiring unit, a cut point detector configured to calculate characteristic amounts from each of the plurality of musical piece contents stored in the musical piece content storage unit, and to detect, as cut points, time points when the characteristic amounts exceed a threshold, a matching judging unit configured to detect, based on the cut points detected by the cut point detector, a plurality of musical piece contents matching each other, out of the plurality of musical piece contents stored in the musical piece content storage unit, an identification information judging unit configured to judge whether the first identification information and the second identification information are attached to the plurality of musical piece contents matching each other, and a musical piece content deleting unit configured to delete, from the musical piece content storage unit, the musical piece content attached with the first identification information out of the plurality of musical piece contents matching each other when the first identification information and the second identification information are judged to be attached to the plurality of musical piece contents matching each other.

When a judgment is made that multiple musical piece contents matching each other are provided with first identification information and second identification information, respectively, a musical piece recording device of the invention is configured to delete the musical piece content provided with the first identification information from a musical piece content storage unit. Specifically, when the multiple contents of the same musical piece are recorded, it is possible to make effective use of a storage capacity of the musical piece content storage unit (such as a HDD) by deleting the musical piece content having lower quality (sound quality). Meanwhile, the time point having a large change in the characteristic amount is defined as the cut point, and based on the cut point, judgment is made on whether the musical piece contents match. Accordingly, it is possible to judge if the musical piece contents match with a smaller amount of operation.

Here, a first acquiring unit may be configured to receive a broadcast signal transmitted wirelessly from a broadcasting station, and to acquire the musical piece content from the received broadcast signal. Meanwhile, a second acquiring unit may be configured to acquire the musical piece content from a recording medium recording the musical piece content, or to acquire, through a communication network, the musical piece content from a distribution server that distributes the musical piece content.

In terms of the contents of the same musical piece, this musical piece recording device can save, into the musical piece content storage unit, the musical piece content acquired from the recording medium or from the distribution server in preference to the musical piece content acquired from the broadcast signal. Accordingly, it is possible to save the musical piece content having higher quality into the musical piece content storage unit.

It is preferable that the device further comprises a noise detector configured to detect noise contained in the plurality of musical piece contents matching each other when the same identification information is attached to the plurality of musical piece contents matching each other, wherein the musical piece content deleting unit deletes the musical piece content having the highest noise out of the plurality of musical piece contents matching each other, based on a result of detection by the noise detector.

In terms of the musical piece contents acquired through a similar acquisition source, this musical piece recording device can save the musical piece content having less noise into the musical piece content storage unit. Accordingly, it is possible to save the musical piece content having higher quality into the musical piece content storage unit.

Still another aspect of the invention provides a musical piece matching judging method that comprises calculating characteristic amounts from each of a plurality of musical piece contents, and detecting, as cut points, time points when the characteristic amounts exceed a threshold, storing information on the cut point concerning each of the plurality of musical piece contents, and judging, based on the stored information on the cut point, whether the plurality of musical piece contents match each other.

Still another aspect of the invention provides a musical piece recording method that comprises acquiring a first musical piece content from a first content source, acquiring a second musical piece content from a second content source configured to offer a musical piece content having higher quality than the first musical piece content, storing the first musical piece content and the second musical piece content, attaching first identification information to the first musical piece content, attaching second identification information to the second musical piece content, calculating characteristic amounts from the first and second musical piece contents, detecting, as cut points, time points when the characteristic amounts of the first and second musical piece contents exceed a threshold, detecting, based on the detected cut points, whether the first musical piece content and the second musical piece content match each other, and deleting the musical piece content attached with the first identification information from a musical piece content storage unit in the case of detection of the musical piece contents matching each other.

Still another aspect of the invention provides a musical piece matching judging program that comprises a program module that calculates characteristic amounts from each of a plurality of musical piece contents, and detects, as cut points, time points when the characteristic amounts exceed a threshold, a program module that stores information on the cut points concerning each of the plurality of musical piece contents, and a program module that judges, based on the stored information on the cut point, whether the plurality of musical piece contents match each other.

Still another aspect of the invention provides a musical piece recording program that comprises a program module that acquires a first musical piece content from a first content source, a program module that acquires a second musical piece content from a second content source configured to offer a musical piece content having higher quality than the first musical piece content, a program module that stores the first musical piece content and the second musical piece content, a program module that attaches first identification information to the first musical piece content, a program module that attaches second identification information to the second musical piece content, a program module that calculates characteristic amounts from each of the first and second musical piece contents, a program module that detects, as cut points, time points when the characteristic amounts of the first and second musical piece contents exceed a threshold, a program module that detects, based on the detected cut points, whether the first musical piece content and the second musical piece content match each other, and a program module that deletes the musical piece content attached with the first identification information from a musical piece content storage unit in the case of detection of the musical piece contents matching each other.

BRIEF DESCRIPTION OF THE DRAWINGS

FIG. 5 is a waveform chart for explaining an operation of a differential calculator according to the first embodiment.

FIGS. 7A to 7C are waveform charts for explaining operations of a segment selector and a segment combining unit according to the first embodiment.

FIGS. 15A and 15B are time charts for explaining the musical piece matching process according to the second modified example of the first embodiment.

DETAILED DESCRIPTION OF EMBODIMENTS

Figure 1:
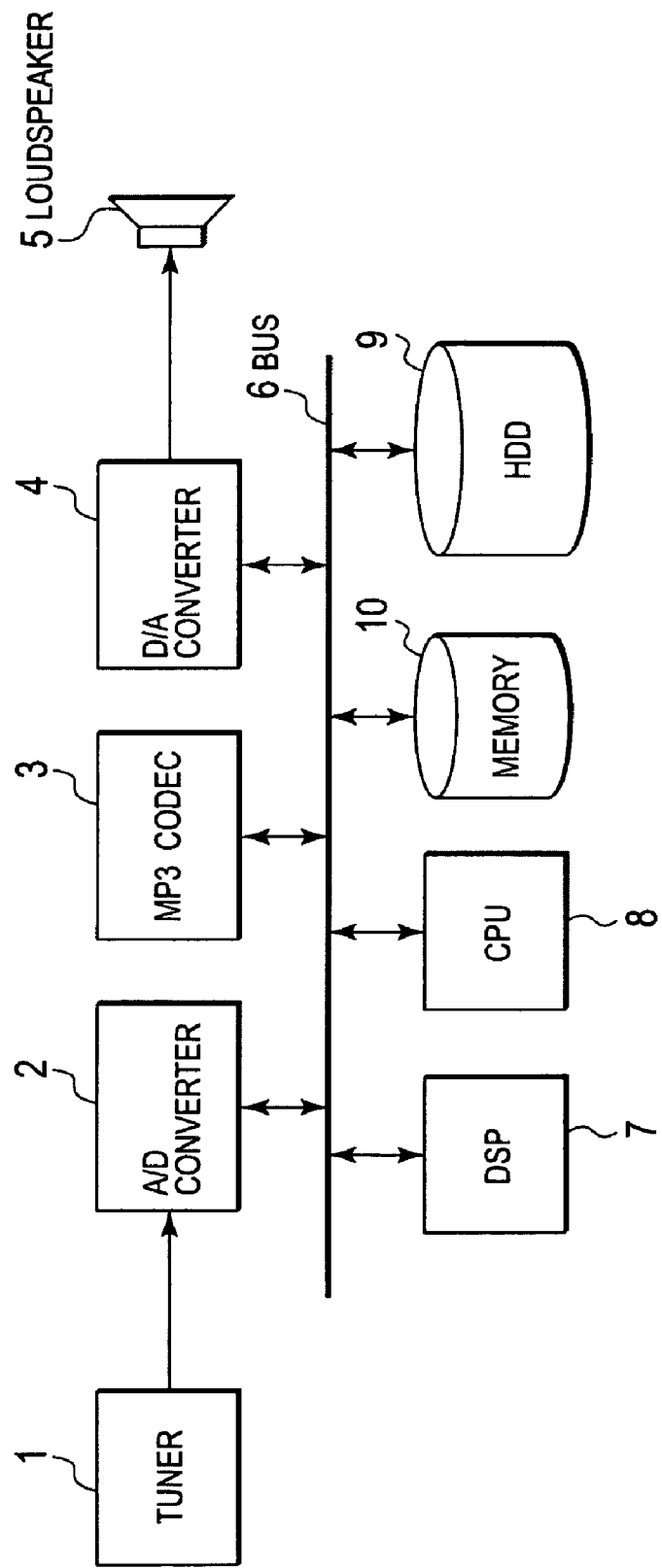
FIG. 1 is a block diagram showing a hardware configuration example of a musical piece recording and playing device according to a first embodiment.

Next, embodiments of the present invention are described with reference to the accompanying drawings. In the following description of the drawings concerning the embodiments, identical or similar constituents are designated by identical or similar reference numerals.

First Embodiment

FIG. 1 is a diagram showing a hardware configuration of a musical piece recording and playing device according to this embodiment. The musical piece recording and playing device includes tuner 1, analog to digital (A/D) converter 2, MPEG Audio Layer-3 (MP3) codec 3, digital to analog (D/A) converter 4, loudspeaker 5, bus 6, digital signal processor (DSP) 7, central processing unit (CPU) 8, hard disk drive (HDD) 9, and memory 10.

A/D converter 2, MP3 codec 3, D/A converter 4, DSP 7, CPU 8, HDD 9, and memory 10 receive various data through bus 6. Tuner 1 receives a broadcast signal of, for example, radio broadcast or the like, and demodulates the broadcast signal into an audio signal. A/D converter 2 converts the audio signal from tuner 1 into digital audio data. MP3 codec 3 has a function as an encoder configured to perform compression coding of the digital audio data for obtaining coded audio data, and a function as a decoder configured to decode the coded audio data. HDD 9 mainly stores the coded audio data. DSP 7 analyzes an inputted audio signal. CPU 8 executes control of the entire musical piece recording and playing device. D/A converter 4 converts the digital audio data decoded by MP3 codec 3 into an analog signal, and then supplies the analog signal to loudspeaker 5. Memory 10 is configured to store programs that is executed by DSP 7 and CPU 8 and is used as a work area in the course of executing the programs by DSP 7 and CPU 8.

Figure 2:
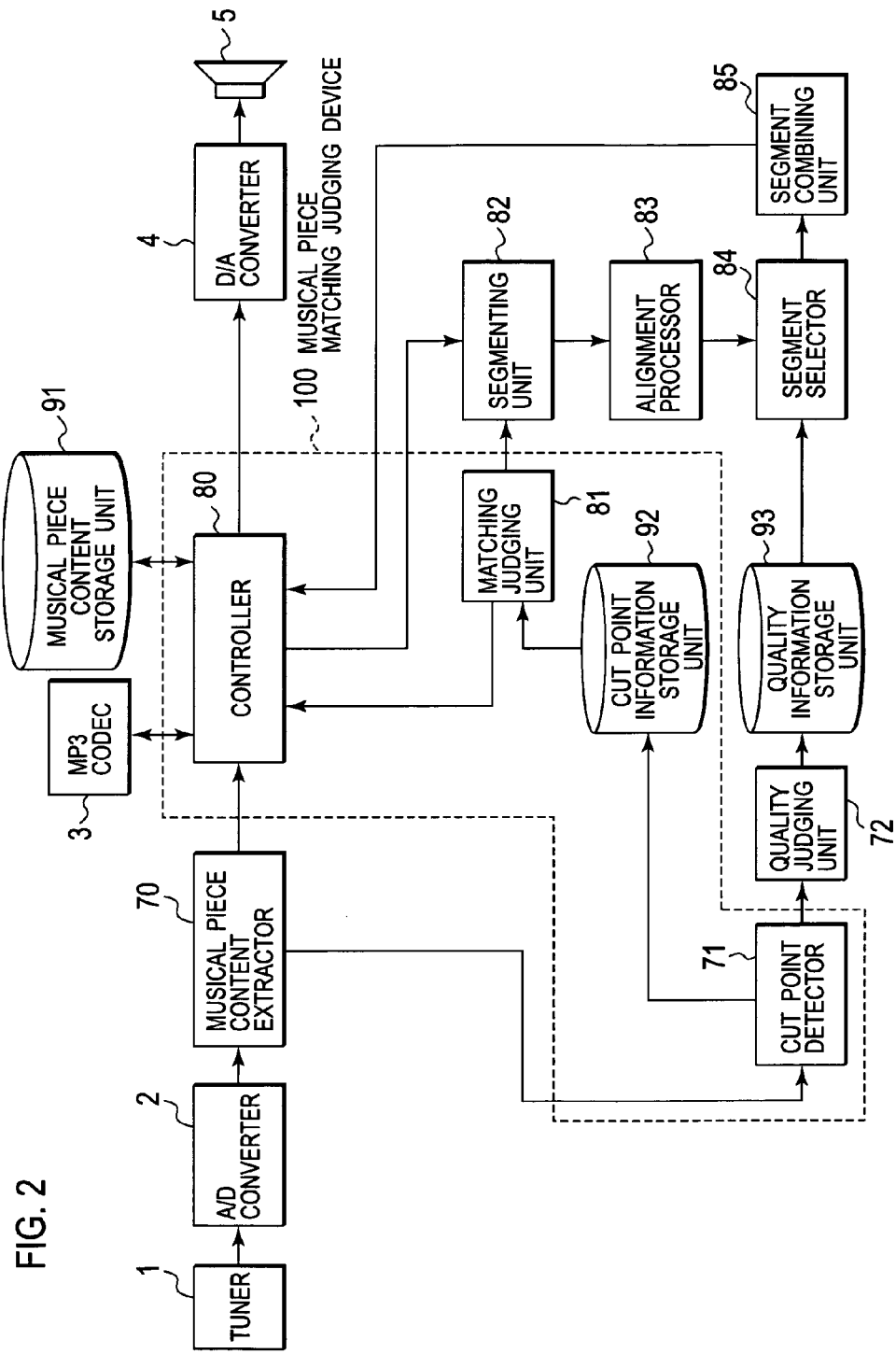
FIG. 2 is a functional block diagram showing a functional configuration example of a musical piece matching judging device according to the first embodiment.

FIG. 2 is a functional block diagram of the musical piece recording and playing device according to this embodiment. In addition to tuner 1, A/D converter 2, MP3 codec 3, D/A converter 4, and loudspeaker 5, the musical piece recording and playing device in FIG. 2 includes musical piece content extractor 70, cut point detector 71, quality judging unit 72, cut point information storage unit 92, quality information storage unit 93, matching judging unit 81, segmenting unit 82, alignment processor 83, segment selector 84, segment combining unit 85, controller 80, and musical piece content storage unit 91. Here, musical piece matching judging unit 100 includes cut point detector 71, cut point information storage unit 92, matching judging unit 81, and controller 80.

Respective functions of musical piece content extractor 70, cut point detector 71, and quality judging unit 72 are performed by DSP 7 shown in FIG. 1. Respective functions of matching judging unit 81, segmenting unit 82, alignment processor 83, segment selector 84, segment combining unit 85, and controller 80 are performed by CPU 8 shown in FIG. 1. Cut point information storage unit 92, quality information storage unit 93, and musical piece content storage unit 91 are stored in HDD 9 shown in FIG. 1.

Musical piece content extractor 70 extracts musical piece contents out of the digital audio data from A/D converter 2. Controller 80 supplies, to MP3 codec 3, the musical piece contents extracted by the musical piece content extractor 70. MP3 codec 3 subjects the musical piece contents to compression coding. The compression coded musical piece contents are recorded in musical piece content storage unit 91. Here, musical piece content extractor 70 may be configured to extract the musical piece contents based on cut points to be described later.

Cut point detector 71 calculates characteristic amounts from the musical piece contents that are extracted by musical piece content extractor 70. Then, cut point detector 71 detects, as cut points, time points when the characteristic amounts exceed a threshold. Here, as the "characteristic amount," an amount of change per unit time of power of the audio signal may be used, for example. As described previously, the power of the audio signal can be obtained by calculating an amplitude spectrum from the audio signal by means of Fourier transform or the like, and then finding a square sum of this amplitude spectrum, for example. More details of cut point detector 71 are described later.

Cut point information storage unit 92 stores information concerning the cut points detected by cut point detector 71. To be more precise, cut point information storage unit 92 stores point count information that links musical piece contents identifiers for identifying the musical piece contents with the number of cut points of each of the musical piece contents. Moreover, cut point information storage unit 92 stores cut point time information that links cut point identifiers for identifying each of the cut points with detected time (elapsed time from starting points of the musical piece contents) of the respective cut points. These two types of information, namely, the point count information and the cut point time information, is hereinafter collectively referred to as "cut point information".

In this way, when a new musical piece content is recorded in musical piece content storage unit 91, the cut point information of the new musical piece content is simultaneously recorded in cut point information storage unit 92.

Quality judging unit 72 judges the quality of the musical piece contents. At least any of noise level (the amplitude) and talk likelihood can be used as a quality judgment standard for the musical piece contents. The following description is based on the case of using both of the noise level and the talk likelihood as the quality judgment standards for the musical piece contents.

Quality judging unit 72 may be configured to judge the quality for each "segment" partitioned by two adjacent cut points, or to judge the quality for each predetermined time period of the musical piece content. The following description is based on the case where quality judging unit 72 judges the quality of the musical piece contents on the segment basis.

When the talk likelihood is used as the quality judgment standard for the musical piece contents, it is possible to distinguish the musical piece contents from the talk by means of clustering that applies a voice recognition technique. To be more precise, a model is formed for each category class by use of Gaussian mixture model (GMM), and a likelihood function indicating the similarity between musical piece contents is prepared for each model. The talk is detected based on the probability (likeliness) calculated based on the likelihood function for inputted sound and talk. Here, the "talk" means the audio signal attached to the musical piece content. For example, an introduction of the musical piece by a disc jockey corresponds to the talk.

Quality information storage unit 93 stores, as quality information, quality of each segment judged by quality judging unit 72. To be more precise, quality information storage unit 93 stores a link between a segment identifier for identifying each segment and the quality information (the noise level and the talk likelihood) on each segment.

Matching judging unit 81 detects overlap between a newly recorded musical piece content and a musical piece content recorded in the past using the cut point information stored in cut point information storage unit 92. For example, matching judging unit 81 judges whether the numbers of cut points in each of the musical piece contents are equal based on the cut point information. If the numbers of the cut points are equal between the musical piece contents, a time interval between a first cut point and a second cut point is calculated for each of the musical piece contents based on the cut point time information. If the time intervals between these cut points in the two musical piece contents are equal, then matching judging unit 81 calculates subsequent time intervals between the next two cut points. The matching judging unit 81 repeats this operation until the last cut points. The matching judging unit 81 judges that the musical piece contents overlap each other when all the time intervals defined by the cut points are equal between the two musical piece contents.

When the two overlapping musical piece contents are detected by matching judging unit 81, controller 80 acquires the two overlapping musical piece contents from musical piece content storage unit 91, and decodes each of the musical piece contents by use of MP3 codec 3. The decoded musical piece contents are supplied to segmenting unit 82.

Segmenting unit 82 divides each of the musical piece contents into multiple segments based on the cut point information. To be more precise, segmenting unit 82 divides the newly recorded musical piece content into segments by using the cut point information on the newly recorded musical piece content, and also divides the musical piece content recorded in the past into segments by using the cut point information on the musical piece content recorded in the past. The two musical piece contents divided into the segments are supplied to alignment processor 83.

Alignment processor 83 aligns the first cut points in the respective musical piece contents in order to adjust the relative position between the musical piece contents. The relative position is adjusted in order to clarify the segments corresponding to each other. Here, as described previously, the segment is a part of the musical piece content located between two adjacent cut points. The two musical piece contents after the alignment process are supplied to segment selector 84.

Segment selector 84 selects the segments having the highest quality among the segments in each of the musical piece contents located in equal temporal positions. A higher quality segment is selected according to the quality information on the two musical piece contents stored in quality information storage unit 93. That is, segment selector 84 reads the noise levels and the talk likelihoods of each of the segments in the musical piece contents out of quality information storage unit 93, and selects the segments having lower noise or the segments having lower talk likelihood. The segments selected by segment selector 84 are supplied to segment combining unit 85.

Segment combining unit 85 sequentially combines the segments selected by segment selector 84, and thereby obtain a single compound musical piece content. Here, the segments are combined together based on the cut points as junctions. The compound musical piece content created by segment combining unit 85 is supplied to controller 80.

Controller 80 subjects the musical piece content supplied from segment combining unit 85 to compression coding by use of MP3 codec 3, and stores the musical piece content after compression coding in musical piece content storage unit 91. At this time, controller 80 deletes, from musical piece content storage unit 91, the original musical piece contents used to obtain the compound musical piece content.

Figure 3:
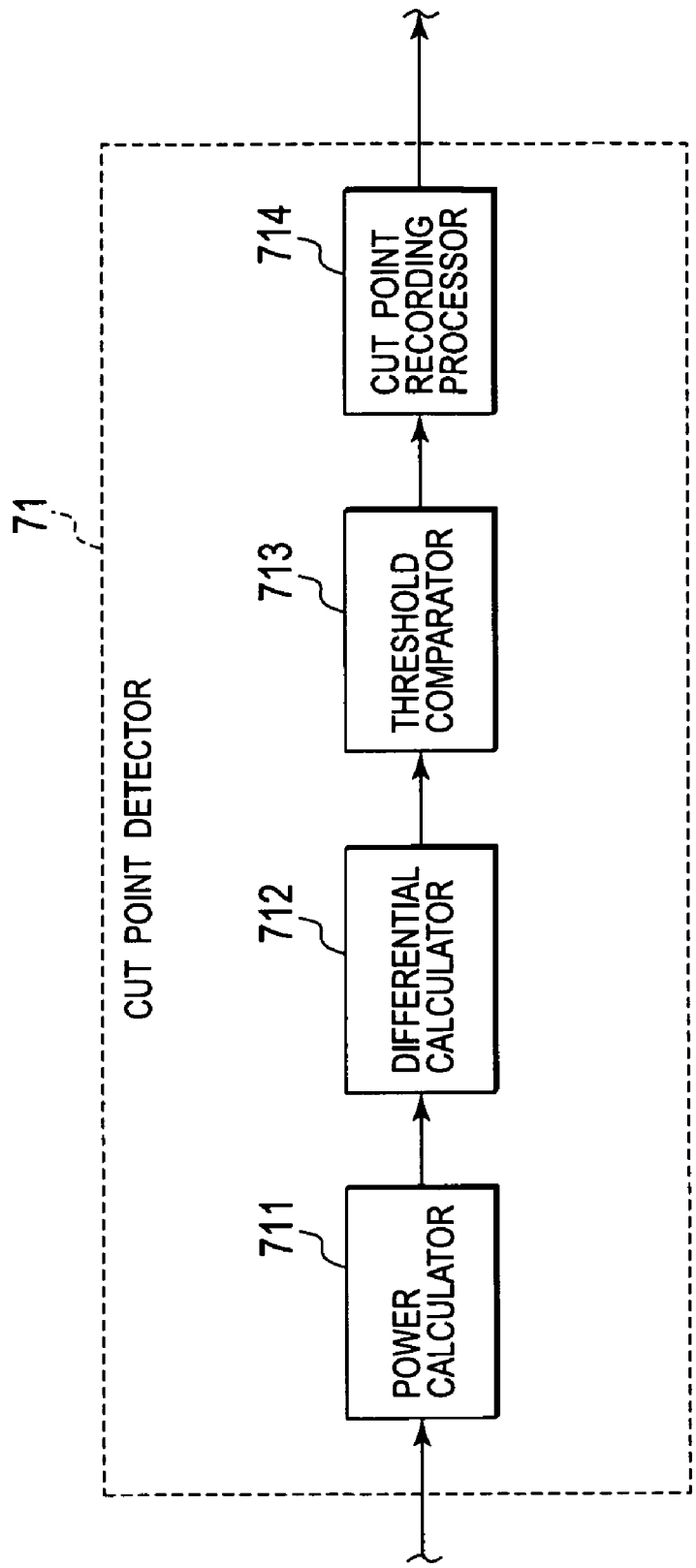
FIG. 3 is a functional block diagram showing a functional configuration example of a cut point detector according to the first embodiment.

Now, FIG. 3 shows a functional block diagram of cut point detector 71. Cut point detector 71 includes power calculator 711, differential calculator 712, threshold comparator 713, and cut point recording processor 714.

Figure 4:
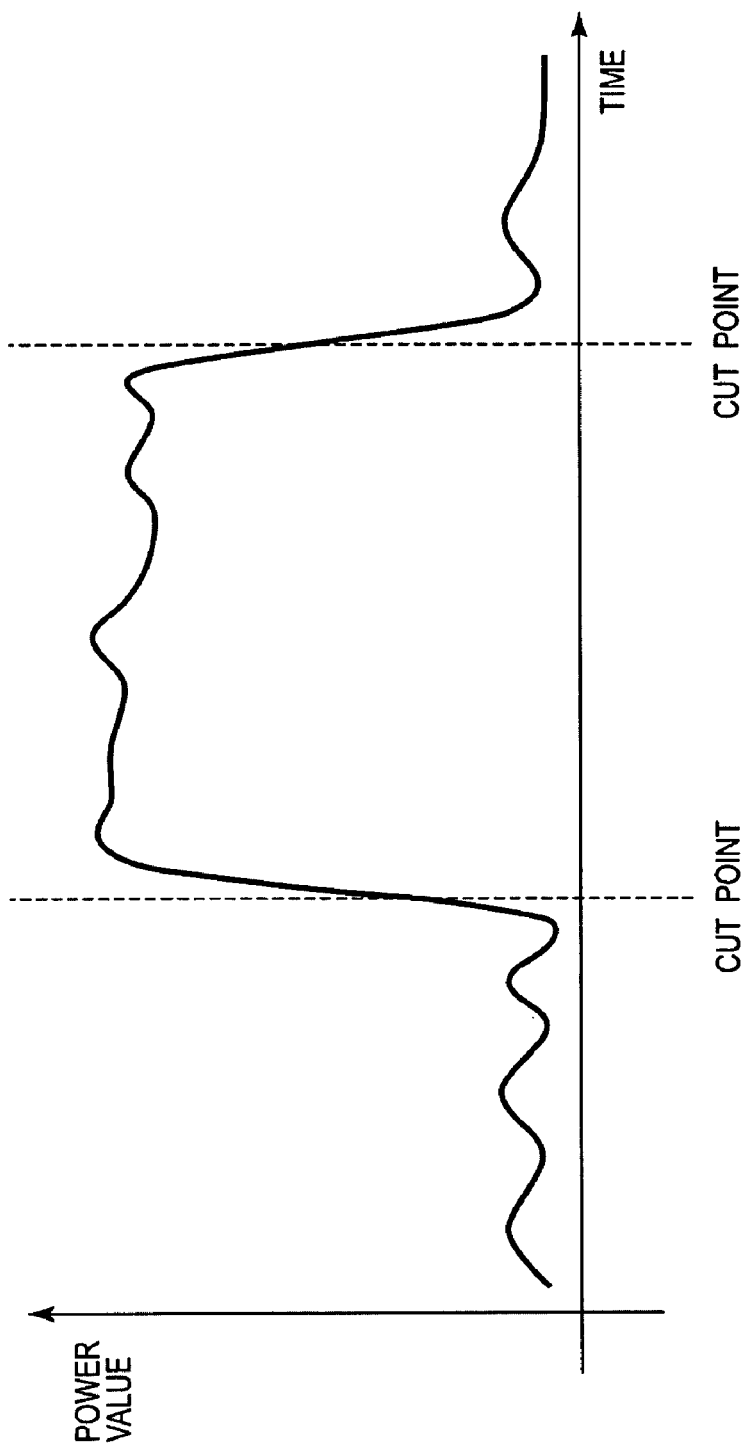
FIG. 4 is a waveform chart for explaining an operation of a power calculator according to the first embodiment.

Power calculator 711 calculates the power of the audio signal from the musical piece content in terms of the time domain as shown in FIG. 4.

In order to detect a change in the power of the audio signal, differential calculator 712 differentiates the power of the audio signal to define a characteristic amount. As shown in FIG. 5, an absolute value of a difference in the average power in a predetermined period W1 before and after time T is calculated as a differential value. As a result of differentiation, the differential value becomes large for the period having the large change in the power.

Threshold comparator 713 determines that there is a large change in the audio signal for the predetermined period calculated by differential calculator 712 if the differential value (the characteristic amount) in the period is equal to or above a predetermined threshold. Threshold comparator 713 detects a starting point and an ending point of that period as the cut points as shown in FIG. 4. Here, the predetermined threshold may be modified depending on the type (category, tune or the like) of the musical piece.

Cut point recording processor 714 records information on the cut points detected by threshold comparator 713 in cut point information storage unit 92.

Here, instead of the configuration shown in FIG. 3, cut point detector 71 may also be configured to perform a frequency analysis in a frequency domain, and to detect the cut points by determining that there is a large change in the sound when the power in a specific frequency band exceeds a threshold, and when that situation continues for a while.

Figures 6A, 6B:
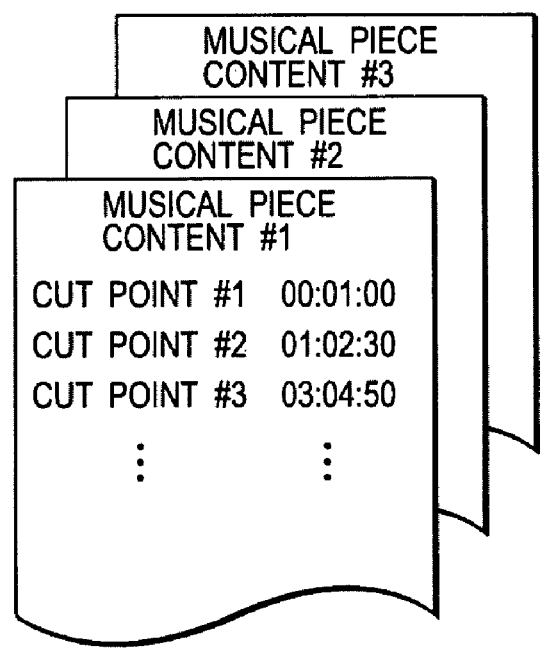
FIG. 6A is a chart showing an example of cut point count information according to the first embodiment.
FIG. 6B is a view showing an example of cut point time information according to the first embodiment.

FIG. 6A is a chart showing an example of the cut point count information to be stored in cut point information storage unit 92. In the example shown in FIG. 6A, musical piece content identifier #1 is linked with a cut point count of 16. Meanwhile, musical piece content identifier #2 is linked with a cut point count of 23. Musical piece content identifier #3 is lined with a cut point count of 16. In this case, musical piece content identifier #1 and musical piece content identifier #3 may be presumed the same musical piece content.

FIG. 6B is a view showing an example of the cut point time information to be stored in cut point information storage unit 92. In the example shown in FIG. 6B, the cut point identifiers are linked with detected time of each of the cut points (elapsed time from the starting points of the musical piece contents) for each of the musical piece content identifiers #1 to #3. As described previously, matching judging unit 81 calculates the time interval between the first cut point and the second cut point for each of the musical piece contents. When the time interval between these cut points are equal between the two musical piece contents. Then, matching judging unit 81 calculates the subsequent time intervals, and repeats this operation until the last cut points to execute the matching judging process for the musical pieces.

(Operation Examples of Segment Selector and Segment Combining Unit)

Next, operations of segment selector 84 and segment combining unit 85 are described with reference to waveform charts shown in FIG. 7A to 7C.

FIGS. 7A and 7B show audio waveforms of the same musical piece content recorded at different time. In the audio waveforms shown in FIGS. 7A and 7B, three cut points #1 to #3 are detected in total.

A segment partitioned by cut points #1 and #2 in FIG. 7A is a segment containing low noise and less talk. A segment partitioned by cut points #2 and #3 in FIG. 7A is a segment containing high noise.

Meanwhile, a segment partitioned by cut points #1 and #2 in FIG. 7B is a segment containing a lot of talk. A segment partitioned by cut points #2 and #3 in FIG. 7B is a segment containing low noise.

Segment selector 84 performs comparative evaluation between the segment partitioned by cut points #1 and #2 in FIG. 7A and the segment partitioned by cut points #1 and #2 in FIG. 7B. Segment selector 84 then selects the segment partitioned by cut points #1 and #2 in FIG. 7A.

Segment selector 84 performs comparative evaluation between the segment partitioned by cut points #2 and #3 in FIG. 7A and the segment partitioned by cut points #2 and #3 in FIG. 7B. Segment selector 84 then selects the segment partitioned by cut points #2 and #3 in FIG. 7B.

As a result, segment combining unit 85 combines the segment partitioned by cut points #1 and #2 in FIG. 7A with the segment partitioned by cut points #2 and #3 in FIG. 7B at cut point #2 as the junction. In this way, the musical piece content with low noise and less talk is created.

(Example of Musical Piece Recording Process Flow)

Next, an example of a musical piece recording process flow according to this embodiment is described with reference to a flowchart shown in FIG. 8.

Figure 8:
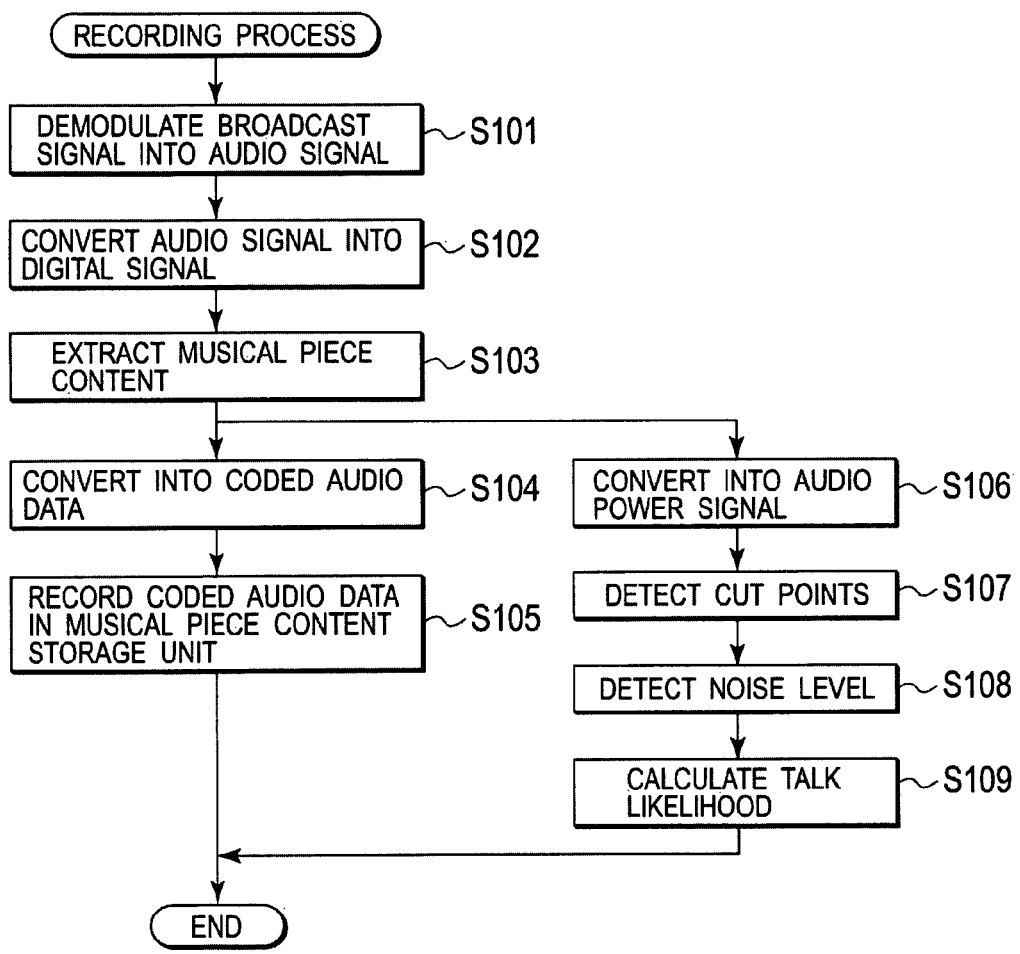
FIG. 8 is a flowchart showing an example of a musical piece recording process flow according to the first embodiment.

In Step S101 in FIG. 8, tuner 1 shown in FIG. 2 receives the broadcast signal of, for example, radio broadcast or the like, and demodulates the broadcast signal into the audio signal. In Step S102, A/D converter 2 converts the audio signal obtained in Step S101 into the digital audio data. In Step S103, musical piece content extractor 70 extracts the musical piece content from the digital audio data obtained in Step S102. In Step S104, MP3 codec 3 subjects the musical piece content, which is obtained in Step S103, to compression coding. In Step S105, controller 80 stores the musical piece content subjected to compression coding in Step S104 in musical piece content storage unit 91.

Meanwhile, in Step S106, power calculator 711 shown in FIG. 3 calculates the power of the audio signal from the musical piece content obtained in Step S103. Moreover, differential calculator 712 differentiates the power of the audio signal calculated by power calculator 711. In Step S107, when the differential value calculated in Step S106 is equal to or above a certain threshold, threshold comparator 713 detects that time as the cut point. The information on the cut point detected by threshold comparator 713 is recorded in cut point information storage unit 92 shown in FIG. 1. In Step S108, quality judging unit 72 shown in FIG. 1 judges the noise level of the musical piece content extracted in Step S103 on the segment basis. In Step S109, quality judging unit 72 judges the talk likelihood of the musical piece content extracted in Step S103 on the segment basis. The information on the noise level and on the talk likelihood judged in Step S108 and Step S109 is recorded in quality information storage unit 93.

(Example of Musical Piece Playing Process Flow)

Next, an example of a musical piece playing process flow according to this embodiment is described with reference to a flowchart shown in FIG. 9.

Figure 9:
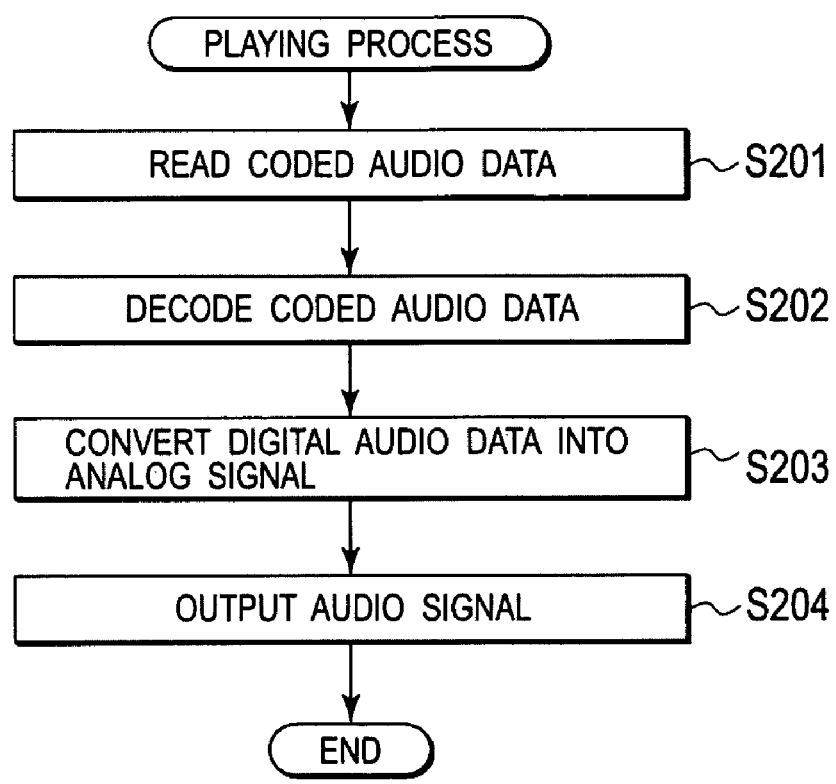
FIG. 9 is a flowchart showing an example of a musical piece playing process flow according to the first embodiment.

In Step S201 in FIG. 9, controller 80 reads the compression coded musical piece content (the coded audio data) out of musical piece content storage unit 91. In Step S202, MP3 codec 3 obtains the digital audio data by decoding the coded audio data read out in Step S201. In Step S203, D/A converter 4 obtains the audio signal by converting the digital audio data obtained in Step S202 into the analog signal. In Step S204, loudspeaker 5 outputs the audio signal obtained in Step S203.

(Example of Musical Piece Combining Process Flow)

Next, an example of a musical piece combining process flow according to this embodiment is described with reference to a flowchart shown in FIG. 10.

Figure 10:
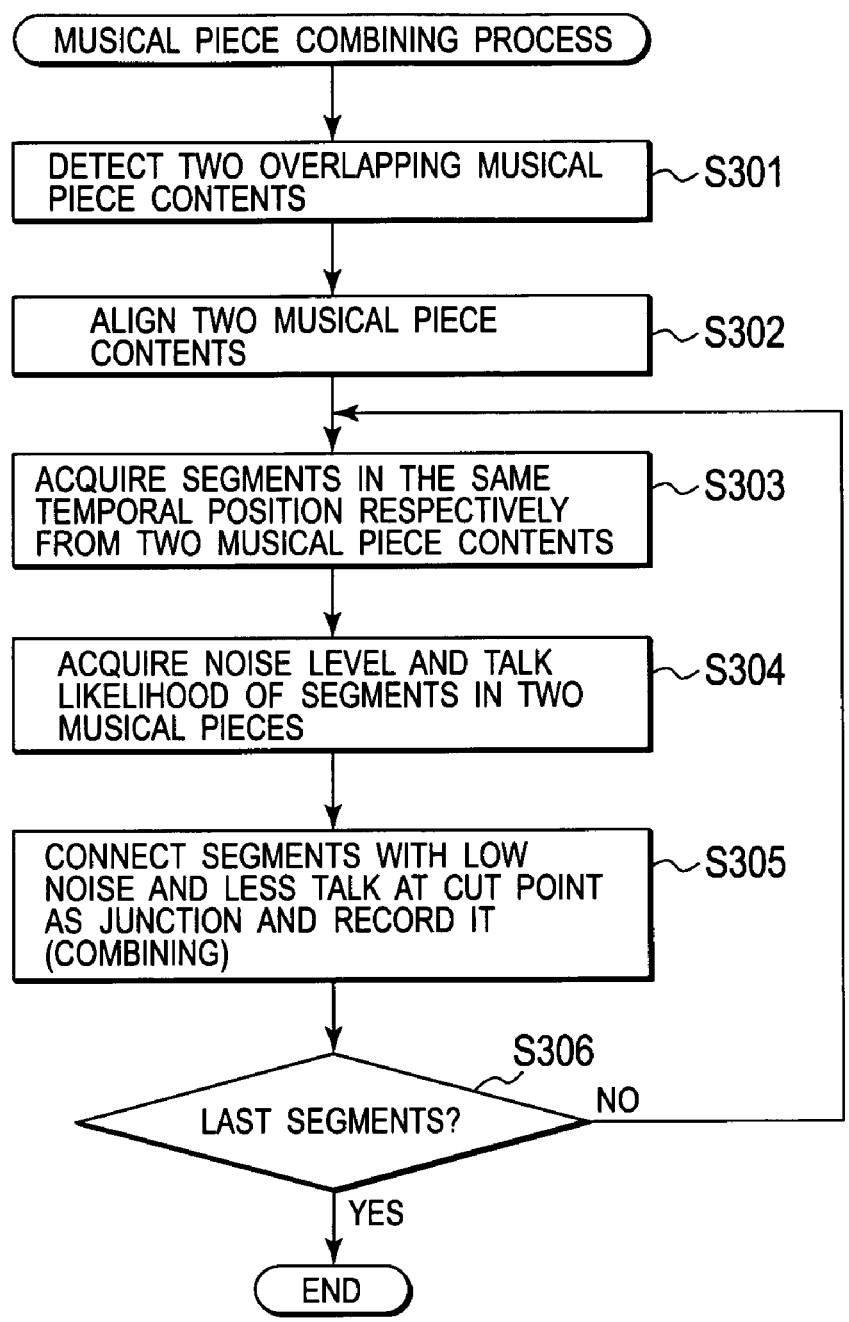
FIG. 10 is a flowchart showing an example of a musical piece combining process flow according to the first embodiment.

In Step S301 in FIG. 10, matching judging unit 81 shown in FIG. 2 executes matching judgment of the cut point information using the cut point information stored in cut point information storage unit 92. Matching judging unit 81 then detects the overlap between the newly recorded musical piece content and the musical piece content recorded in the past. Details of Step S301 are described later.

In Step S302, alignment processor 83 aligns the first cut points of each of the musical piece contents in order to adjust the relative position between the musical piece contents. Details of Step S302 are described later.

In Step S303, segment selector 84 acquires the segments in each of the musical piece contents located in the equal temporal positions from musical piece content storage unit 91 via MP3 codec 3 and controller 80.

In Step S304, segment selector 84 acquires, from quality information storage unit 93, the quality information (the noise level and the talk likelihood) on the segments in each of the musical piece contents located in the equal temporal positions. Segment selector 84 selects the segments with lower noise or the segments having lower talk likelihood.

In Step S305, segment combining unit 85 combines the segments selected in Step S304 with each other at the cut point as the junction.

In Step S306, controller 80 judges whether the musical piece matching judging process is completed for the last segments out of the segments of each of the musical piece contents. When controller 80 judges that the musical piece matching process is completed for the last segments, the musical piece matching judging process is terminated. If controller 80 judges that the musical piece matching judging process has not been completed for the last segments, the process returns to Step S303.

(Example of Matching Judging Process Flow)

Next, a matching judging process, or the details of Step S301 in FIG. 10, is described with reference to a flowchart shown in FIG. 11. It is to be noted that the cut points in one of the musical piece contents (a first musical piece) used for matching is defined as T0 to TN, and that the cut points in the other musical piece content (a second musical piece) used for matching is defined as S0 to SN (N; an integer equal to or above 1).

Figure 11:
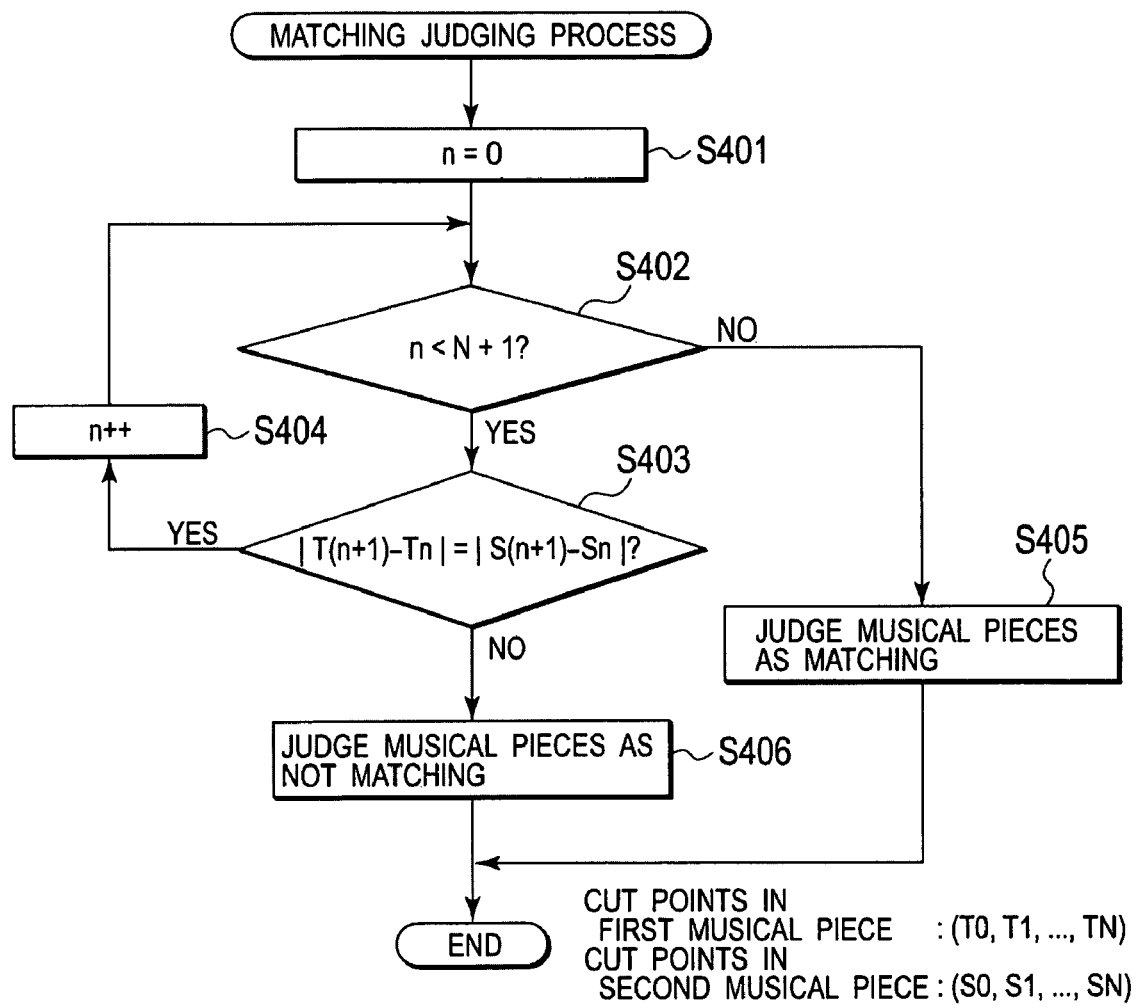
FIG. 11 is a flowchart showing an example of a musical piece matching judging process flow in the musical piece matching judging process according to the first embodiment.

In Step S401 in FIG. 11, matching judging unit 81 initializes a variable n to 0.

In Step S402, matching judging unit 81 judges whether the variable n is smaller than N+1, in order to judge whether the matching judging process is completed for the last cut points of each of the musical piece contents. The process goes to Step S403 when the variable n is smaller than N+1. The process goes to Step S405 when the variable n is equal to or above N+1.

In Step S403, matching judging unit 81 judges whether |T(n+1)−Tn| is equal to |S(n+1)−Sn| in order to judge whether durations of the segments partitioned by the two adjacent cut points are equal between the two musical piece contents. The process goes to Step S404 when |T(n+1)−Tn| is judged to be equal to |S(n+1)−Sn|. The process goes to Step S406 when |T(n+1)−Tn| is not judged to be equal to |S(n+1)−Sn|.

In Step S404, matching judging unit 81 increments the variable n, and then the process returns to Step S402.

Meanwhile, in Step S405, matching judging unit 81 judges that the two musical piece contents match each other since all the durations of the segments in each of the musical piece contents match one another.

On the other hand, in Step S406, matching judging unit 81 judges that the two musical piece contents do not mach each other since the durations of the segments in each of the musical piece contents do not match one another.

(Example of Alignment Process Flow)

Next, an alignment process, or the details of Step S302 in FIG. 10, is described with reference to a flowchart shown in FIG. 12. It is to be noted that the cut points in one of the musical piece contents (the first musical piece) used for matching is defined as T0 to TN, and that the cut points in the other musical piece content (the second musical piece) used for matching is defined as S0 to SN (N; the integer equal to or above 1).

Figure 12:
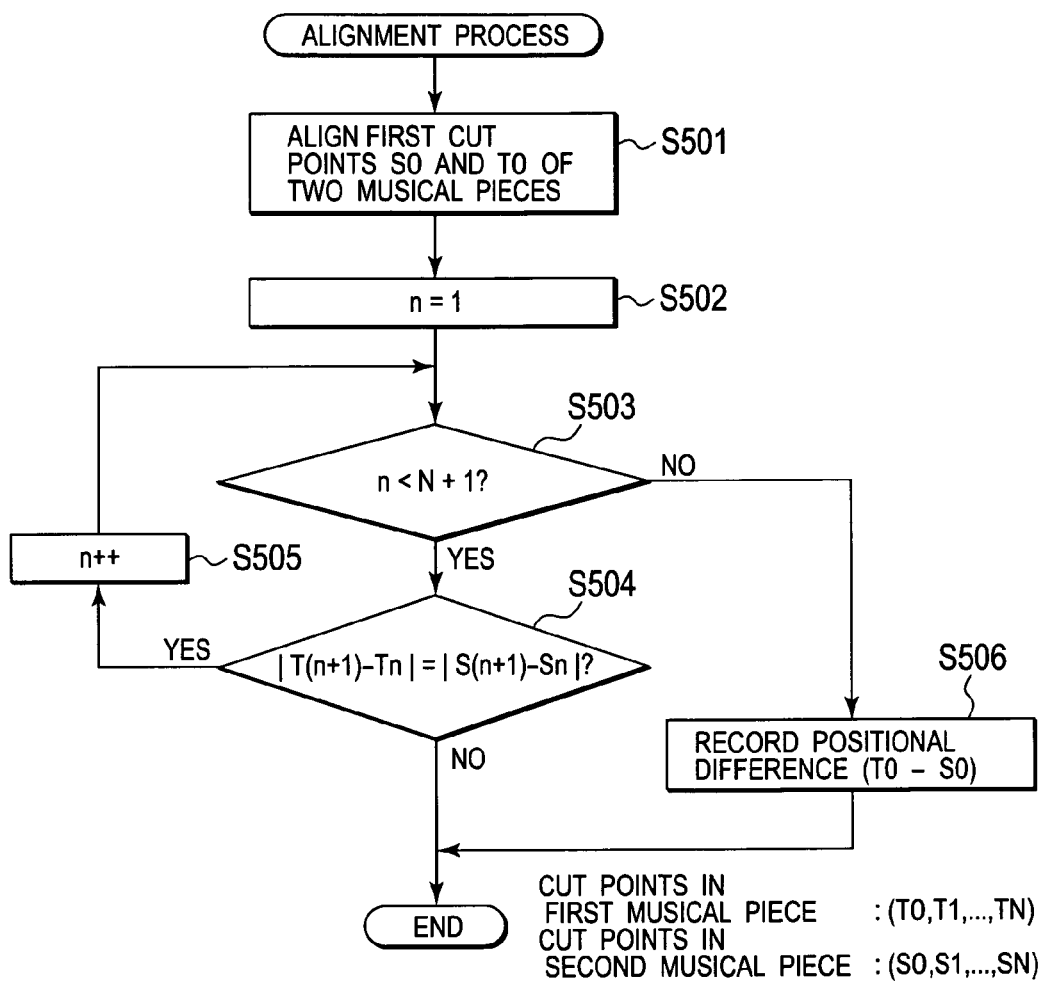
FIG. 12 is a flowchart showing an example of an alignment process flow in the musical piece matching judging process according to the first embodiment.

In Step S501 in FIG. 12, alignment processor 83 aligns the temporal positions of the first cut points S0 and T0 of the respective two musical piece contents.

In Step S502, alignment processor 83 initializes the variable n to 1. In Step S503, alignment processor 83 judges whether the variable n is smaller than N+1 in order to judge whether the alignment process is completed for the last cut points of each of the musical piece contents. The process goes to Step S504 when the variable n is smaller than N+1. The process goes to Step S506 when the variable n is equal to or above N+1.

In Step S504, alignment processor 83 judges whether |T(n+1)−Tn| is equal to |S(n+1)−Sn| in order to judge whether the durations of the segments partitioned by the two adjacent cut points are equal between the two musical piece contents. The process goes to Step S505 when |T(n+1)−Tn| is judged to be equal to |S(n+1)−Sn|. The alignment process is terminated when |T(n+1)−Tn| is not judged to be equal to |S(n+1)−Sn|.

In Step S505, alignment processor 83 increments the variable n, and then the process returns to Step S503.

In Step S506, alignment processor 83 records a difference in the temporal positions between the first cut points S0 and T0 of the respective two musical piece contents.

As described above in detail, according to this embodiment, the time point when there is a large change in the characteristic amount in the musical piece is stored as the cut point. Then, matching judgment of the musical pieces is executed based on the information on this cut point. Accordingly, it is possible to match the musical pieces with a small amount of operation.

Moreover, according to this embodiment, cut point detector 71 calculates, from the musical piece content, the amount of change per unit time of either power or the frequency of the audio signal as the characteristic amount. Accordingly, it is possible to obtain the preferable characteristic amount from the musical piece content, and thereby to detect the accurate cut point.

Further, according to this embodiment, matching judging unit 81 judges whether the multiple musical piece contents match each other based on the numbers of cut points in each of the musical piece contents. Accordingly, it is possible to execute matching of the musical pieces easily and to reduce the amount of operation.

According to this embodiment, matching judging unit 81 judges whether the multiple musical piece contents match each other based on the time intervals between the cut points in each of the musical piece contents. Accordingly, it is possible to execute matching of the musical pieces easily and to reduce the amount of operation.

FIRST MODIFIED EXAMPLE

The matching process in the above-described embodiment explains the case of judging whether the durations of the segments partitioned by the two adjacent cut points are equal between the two musical piece contents.

However, the detected positions of the cut points may vary depending on conditions of the musical piece contents. Accordingly, it is preferable to execute matching judgment while allowing for some displacement.

Figure 13:
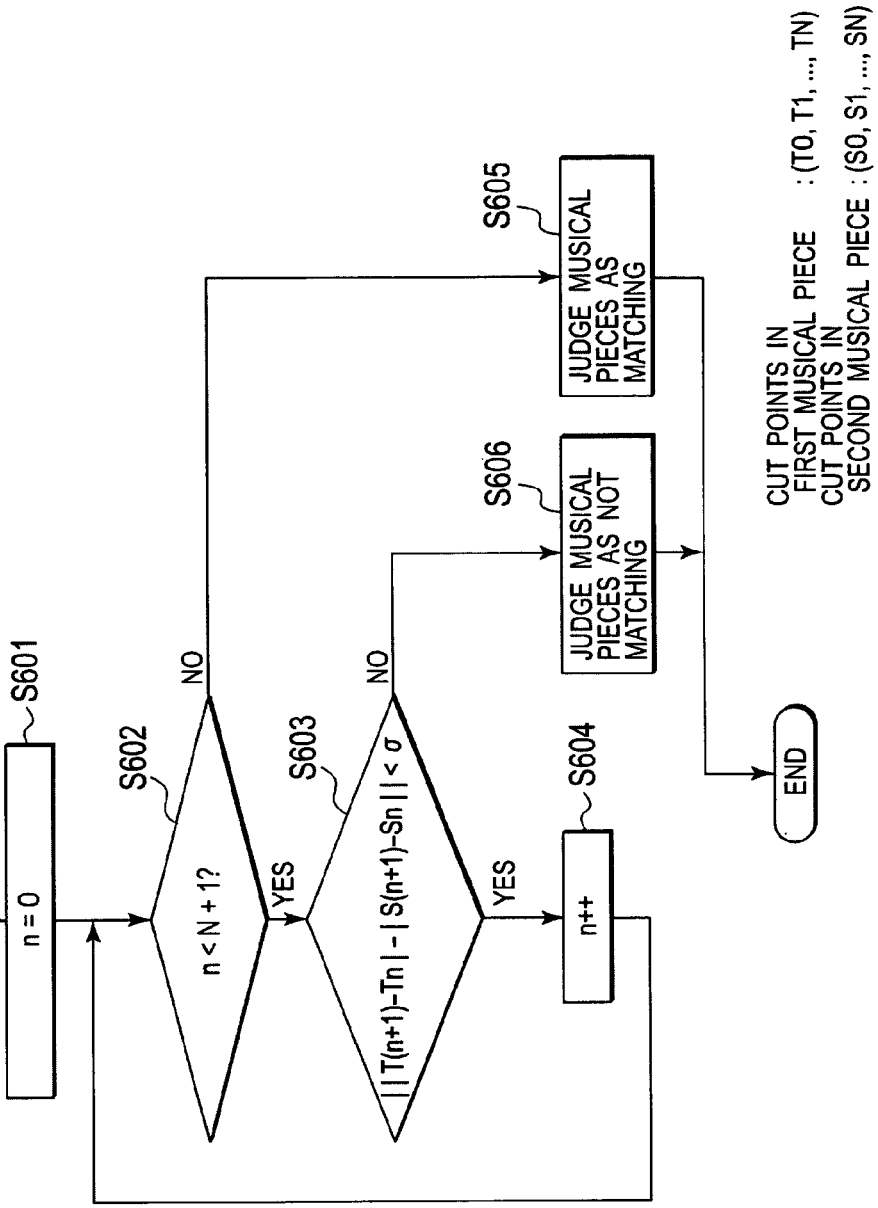
FIG. 13 is a flowchart showing an example of a musical piece matching judging process flow according to a first modified example of the first embodiment.

Consequently, a matching judgment process that allows for some displacement is described in this modified example with reference to a flowchart shown in FIG. 13. In FIG. 13, the cut points in one of the musical piece contents (the first musical piece) used for matching is defined as T0 to TN, and the cut points in the other musical piece content (the second musical piece) used for matching is defined as S0 to SN (N; the integer equal to or above 1). It to be noted, however, that duplicate explanation for the procedures similar to those in FIG. 11 is omitted herein.

In Step S601 in FIG. 13, matching judging unit 81 initializes the variable n to 0.

In Step S602, alignment processor 83 judges whether the variable n is smaller than N+1 in order to judge whether the alignment process is completed for the last cut points of each of the musical piece contents. The process goes to Step S603 when the variable n is smaller than N+1. The process goes to Step S605 when the variable n is equal to or above N+1.

In Step S603, matching judging unit 81 judges whether a difference in the durations of the segments of the musical piece contents located in the same temporal position is smaller than a predetermined threshold σ. The process goes to Step S604 when the difference in the durations of the segments of the musical piece contents located in the same temporal position is judged to be smaller than the predetermined threshold σ. On the other hand, the process goes to Step S606 when the difference in the durations of the segments of each of the musical piece contents located in the same temporal position is judged to be equal to or above the predetermined threshold σ.

In Step S604, matching judging unit 81 increments the variable n, and then the process returns to Step S602.

Meanwhile, in Step S605, matching judging unit 81 judges that the two musical piece contents match each other because the durations of the segments in each of the musical piece contents match one another either entirely or substantially.

On the other hand, in Step S606, matching judging unit 81 judges that the two musical piece contents do not mach each other since the durations of the segments in each of the musical piece contents do not match one another at all or do match one another only scarcely.

As described above, according to this modified example, it is possible to execute matching judgment while allowing for some displacement in the detected positions of the cut points.

SECOND MODIFIED EXAMPLE

The above-described embodiment explains the case of executing the matching judging process shown in FIG. 11 when the numbers of cut points of each musical piece content are equal to each other.

However, even in the case of the same musical piece, there is a possibility that the numbers of the cut points may be different because one of the musical piece contents lacks a beginning part of the musical piece, for example. To be more precise, a musical piece content obtained by extraction from television broadcast or radio broadcast may lack the beginning part of the contents.

Figure 14:
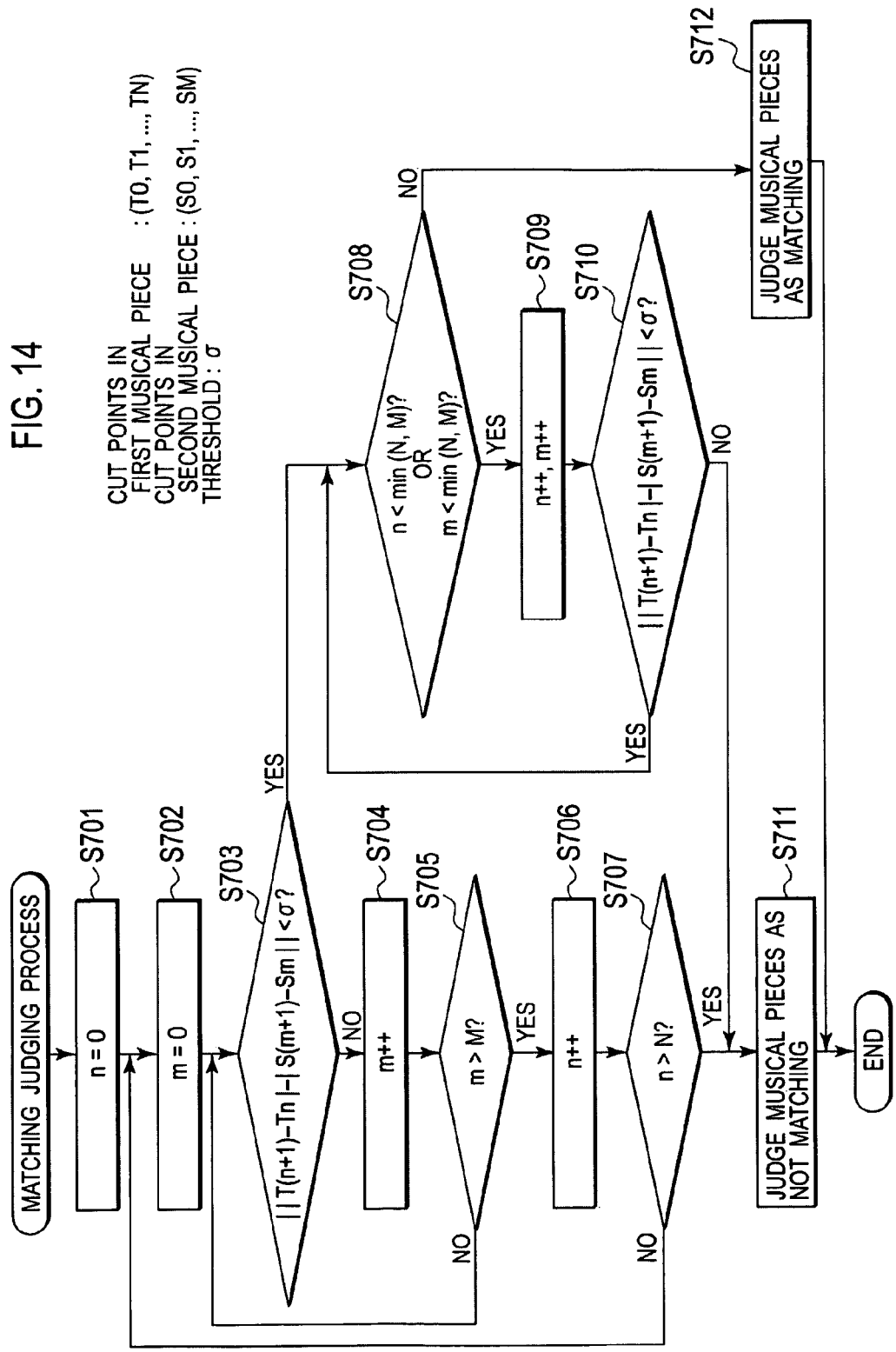
FIG. 14 is a flowchart showing an example of a musical piece matching judging process flow according to a second modified example of the first embodiment.

For this reason, a matching judgment process that enables detection of same musical piece contents even with different numbers of the cut points is described in this modified example with reference to a flowchart shown in FIG. 14. In FIG. 14, the cut points in one of the musical piece contents (the first musical piece) used for matching is defined as T0 to TN, and the cut points in the other musical piece content (the second musical piece) used for matching is defined as S0 to SM (N and M; integers equal to or above 1). It to be noted, however, that duplicate explanation for the procedures similar to those in FIG. 11 and FIG. 13 is omitted herein.

In Step S701 in FIG. 14, matching judging unit 81 initializes the variable n to 0. As shown in FIG. 15A, the variable n is provided for designating the cut points of the first musical piece content #1 sequentially from the beginning.

In Step S702, matching judging unit 81 initializes a variable m to 0. As shown in FIG. 15B, the variable m is provided for designating the cut points of the second musical piece content #2 sequentially from the beginning.

In Step S703, matching judging unit 81 judges whether the difference in the durations of the segments in each of the musical piece contents is smaller than the predetermined threshold σ. In the case of FIGS. 15A and 15B, a judgment is made as to whether the difference in the duration of a segment 1 in each of the musical piece contents #1 and #2 is smaller than the predetermined threshold σ. The process goes to Step S708 when the difference in the durations of the segments is judged to be smaller than the predetermined threshold σ. On the other hand, the process goes to Step S704 when the difference in the durations of the segments is judged to be equal to or above the predetermined threshold σ.

In Step S704, matching judging unit 81 increments the variable m. In Step S705, matching judging unit 81 judges whether the variable m is greater than M. The process goes to Step S706 when the variable m is judged to be greater than M. On the other hand, the process returns to Step S703 when the variable m is judged to be equal to or below M.

In Step S706, matching judging unit 81 increments the variable n. In Step S707, matching judging unit 81 judges whether the variable n is greater than N. The process goes to Step S711 when the variable n is judged to be greater than N. On the other hand, the process returns to Step S702 when the variable n is judged to be equal to or below N.

As a result, by initializing the variable m to 0, a cut point #1 of the musical piece content #1 and a cut point #0 of the musical piece content #2 are designated by the variables n and m, respectively, in the example in FIGS. 15A and 15B. Accordingly, a segment 2 in the musical piece content #1 and the segment 1 in the musical piece content #2 are compared and judged whether these segments match each other.

In Step S708, matching judging unit 81 judges whether any of the variables n and m is smaller than a smaller number out of N and M. The process goes to Step S709 when any of the variables n and m is judged to be smaller than the smaller number out of N and M. On the other hand, the process goes to Step S712 when any of the variables n and m is judged to be equal to or above the smaller number out of N and M.

Matching judging unit 81 increments the variables n and m in Step S709. In Step S710, matching judging unit 81 judges whether the difference in the durations between the segments is smaller than the predetermined threshold σ. In the example shown in FIGS. 15A and 15B, a judgment is made as to whether the different between the duration of a segment 3 in the musical piece content #1 and the duration of a segment 2 in the musical piece content #2 is smaller than the predetermined threshold σ. The process returns to Step S708 when the difference in the durations between the segments is smaller than the predetermined threshold σ. On the other hand, the process goes to Step S711 when the difference in the durations between the segments is equal to or above the predetermined threshold σ.

In step S711, matching judging unit 81 judges that the musical piece contents do not mach each other since the difference in the durations of the segments in each of the musical piece contents do not match one another at all or do match one another only scarcely. Meanwhile, in Step S712, matching judging unit 81 judges that the musical piece contents match each other since the difference in the durations of the segments in each of the musical piece contents match one another either entirely or substantially.

As described above, according to this modified example, it is possible to detect the same musical pieces with different numbers of cut points by means of utilizing characteristics of the segments.

Here, in the matching judging process according to this modified example, it is essential to designate, by use of the variable n. the cut points of the musical piece content having a larger number of cut points out of the two musical piece contents having different numbers of cut points.

Second Embodiment

Next, a second embodiment is described. Here, different features from those in the first embodiment are mainly described in this embodiment, and duplicate explanation is omitted herein.
(Schematic Configuration of Musical Piece Recording and Playing Device)

Figure 16:
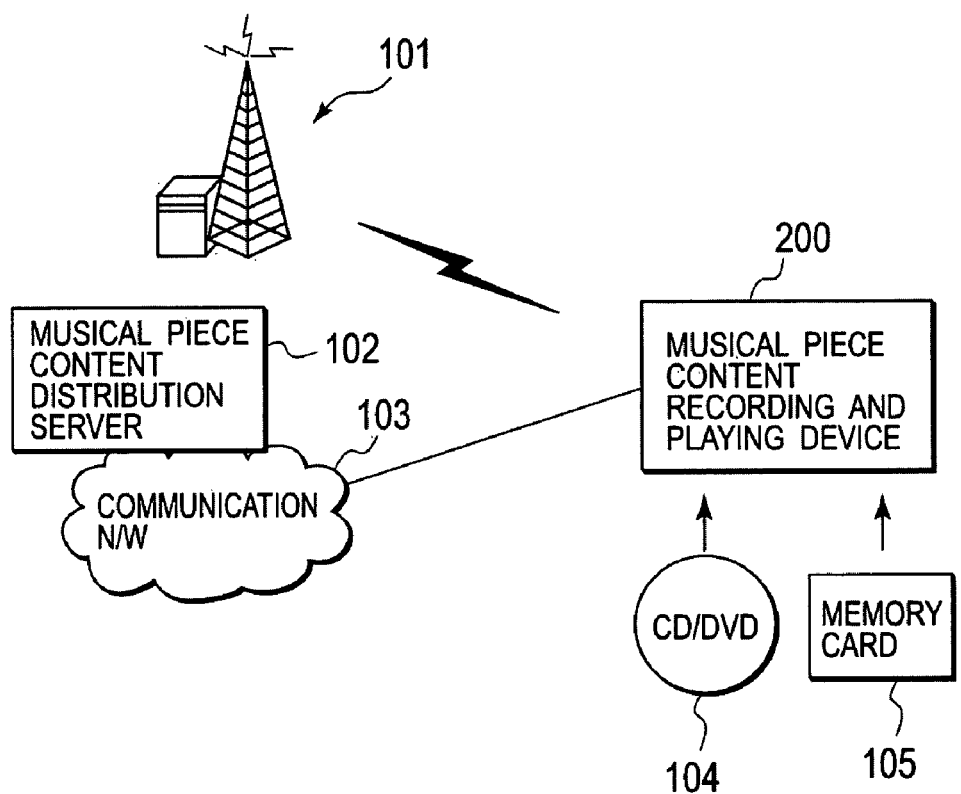
FIG. 16 is a view showing a schematic configuration of a musical piece recording and playing device according to a second embodiment.

FIG. 16 is a view showing a schematic configuration of musical piece recording and playing device 200 according to this embodiment. As shown in FIG. 16, musical piece recording and playing device 200 is able to acquire musical piece contents from multiple acquisition sources.

To be more precise, musical piece recording and playing device 200 receives a FM broadcast signal transmitted wirelessly from FM broadcasting station (FM radio station) 101, and acquires musical piece contents from the received FM broadcast signal.

Moreover, musical piece recording and playing device 200 acquires musical piece contents from a recording medium for recording the musical piece contents, namely, from CD/DVD 104 or memory card 105.

In addition, musical piece recording and playing device 200 acquires musical piece contents from musical piece content distribution server 102 for distributing the musical piece contents through communication network 103.

Musical piece recording and playing device 200 is configured to automatically record the musical piece contents acquired from the FM broadcast signal, to record the musical piece contents downloaded from musical piece content distribution server 102, and to record the musical piece contents read out of the recording medium (CD/DVD 104 or memory card 105). Accordingly, multiple contents of the same musical piece may be recorded in musical piece recording and playing device 200, and a storage capacity of HDD 9 may be wasted as a consequence.

Consequently, when the multiple contents of the same musical piece are recorded, musical piece recording and playing device 200 deletes an unnecessary musical piece content, i.e. the musical piece content having lower quality (sound quality) from the multiple contents of the same musical piece.

Here, the musical piece contents acquired from the FM broadcast signal contain a lot of noise. The noise may also include talk (such as introduction of the musical piece). In other words, the musical piece contents acquired from the FM broadcast signal has lower quality (sound quality). On the other hand, the musical piece contents acquired from the recording medium (CD/DVD 104 or memory card 105) and from musical piece content distribution server 102 have less noise and higher quality.

Accordingly, if a musical piece content recorded from the CD/DVD 104 and another musical piece content recorded from the FM broadcast signal are the same, for example, then music recording and playing device 200 deletes the musical piece content recorded from the FM broadcast signal.
(Hardware Configuration of Musical Piece Recording and Playing Device)

Figure 17:
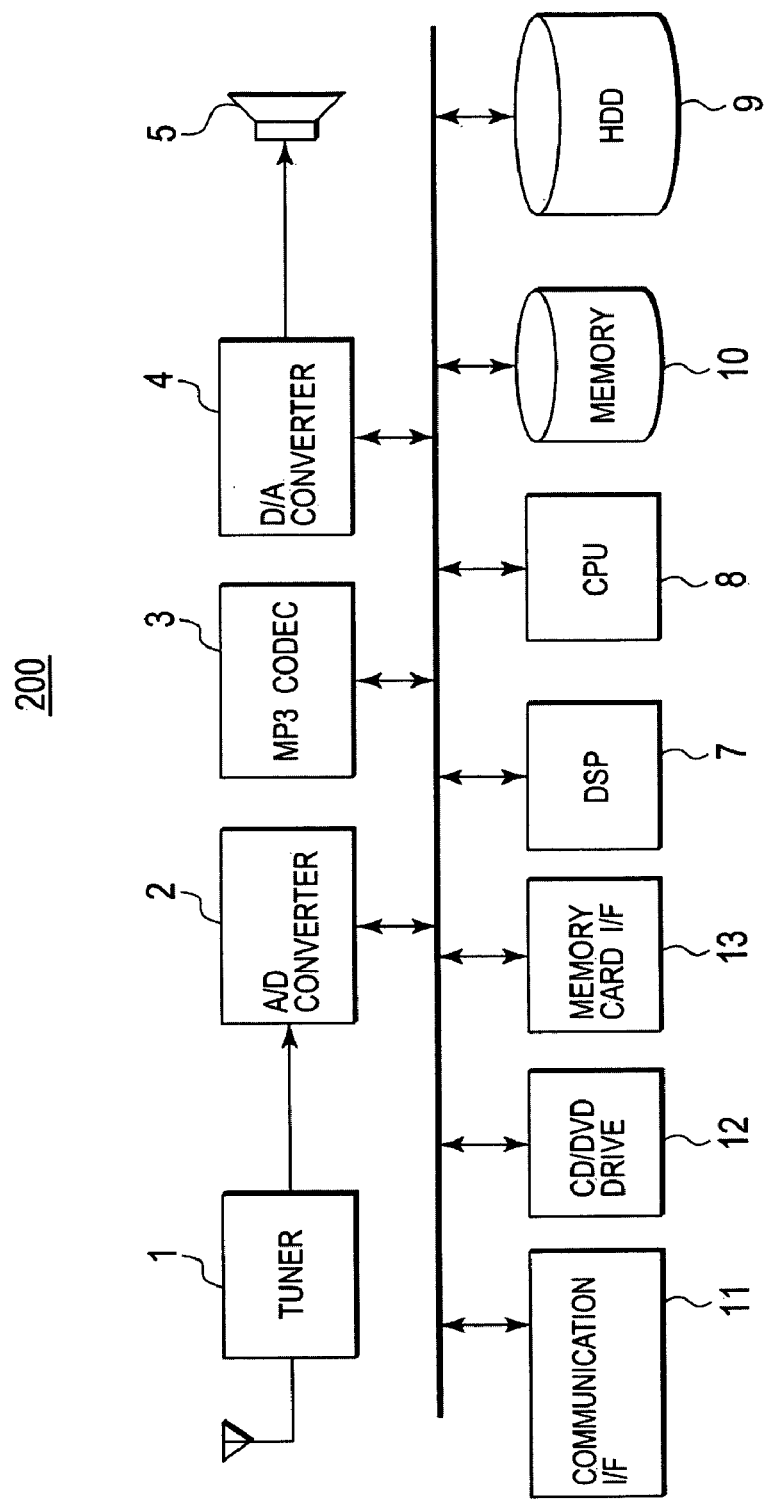
FIG. 17 is a block diagram showing a hardware configuration example of the musical piece recording and playing device according to the second embodiment.

FIG. 17 is a block diagram showing a hardware configuration example of musical piece recording and playing device 200 according to this embodiment.

As shown in FIG. 17, in addition to the configuration shown in FIG. 1, musical piece recording and playing device 200 includes communication interface (hereinafter referred to as "communication I/F") 11, CD/DVD drive 12, and memory card interface (hereinafter referred to as "memory card I/F") 13.

Communication I/F 11 functions as an interface with communication NW 103 and communicates with musical piece distribution server 102 through communication NW 103. Moreover, communication I/F 11 downloads the musical piece contents from musical piece distribution server 102 through communication N/W 103.

CD/DVD drive 12 rotates the CD/DVD and optically reads the musical piece contents written on the CD/DVD. Memory card I/F 13 accesses memory card 105 and reads the musical piece contents that are stored in memory card 105.
(Functional Block Configuration of Musical Piece Recording and Playing Device)

Figure 18:
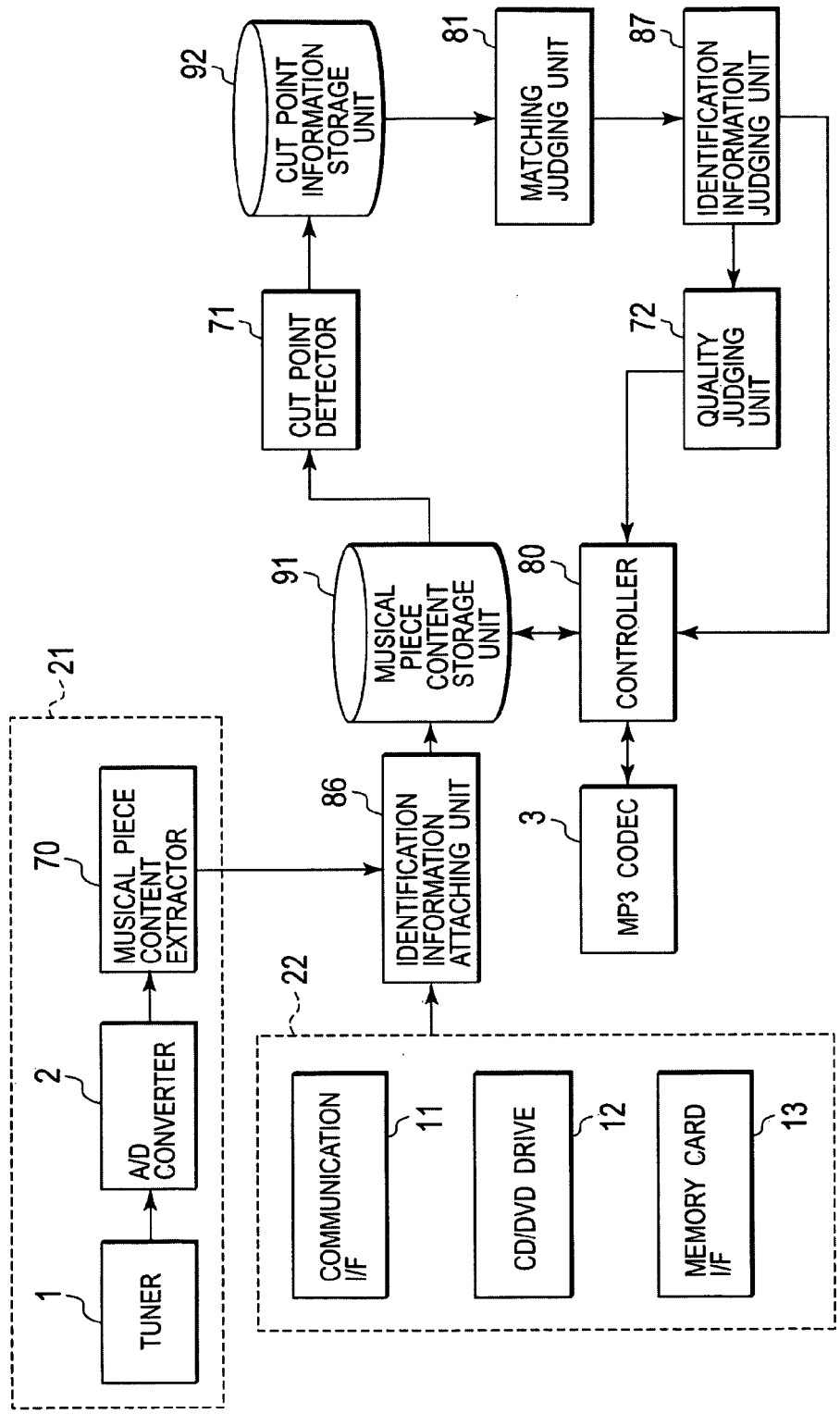
FIG. 18 is a functional block diagram showing a functional configuration example of a recording system of the musical piece recording and playing device according to the second embodiment.

FIG. 18 is a functional block diagram showing a functional configuration example of a recording system of musical piece recording and playing device 200.

As shown in FIG. 18, musical piece recording and playing device 200 includes first musical piece content acquiring unit 21, second musical piece content acquiring unit 22, identification information attaching unit 86, musical piece contents storage unit 91, cut point detector 71, cut point information storage unit 92, matching judging unit 81, identification information judging unit 87, quality judging unit 72, controller 80, and MP3 codec 3.

First musical piece content acquiring unit 21 receives the FM broadcast signal transmitted wirelessly from FM broadcasting station 101, and acquires the musical piece contents from the received FM broadcast signal. Tuner 1, A/D converter 2, and musical piece content extractor 70 inside first musical piece content acquiring unit 21 may be configured similarly to those in the first embodiment.

Second musical piece content acquiring unit 22 includes above-described communication I/F 11, CD/DVD drive 12, and memory card I/F 13.

Identification information attaching unit 86 attaches a FM record flag to the musical piece content acquired by first musical piece content acquiring unit 21. On the other hand, identification information attaching unit 86 attaches a purchase flag to the musical piece content acquired by second musical piece content acquiring unit 22.

Here, the FM record flag is a flag indicating that the musical piece content has been recorded from the FM broadcast (automatically recorded). Meanwhile, the purchase flag is a flag indicating that the musical piece content has been purchased, i.e. acquired from the recording medium (CD/DVD 104 or memory card 105) or acquired from musical piece content distribution server 102.

Musical piece content storage unit 91, cut point detector 71, cut point information storage unit 92, and matching judging unit 81 are configured similarly to the above-described first embodiment. However, in this embodiment, matching judging unit 81 detects multiple musical piece contents that match each other out of the multiple musical piece contents stored in musical piece content storage unit 91 using the cut point information.

Identification information judging unit 87 judges whether the FM record flag and the purchase flag are attached to the multiple musical piece contents that match each other.

When a judgment is made that the FM record flag and the purchase flag are attached to the multiple musical piece contents that match each other, controller 80 deletes, from musical piece content storage unit 91, the musical piece content attached with the FM record flag out of the multiple musical piece contents matching each other.

Meanwhile, when the same identification information is attached to the multiple musical piece contents matching each other, quality judging unit 72 detects noise contained in the multiple musical piece contents matching each other.

In the above-described first embodiment, quality judging unit 72 is configured to create the quality information for each segment. However, in this embodiment, quality judging unit 72 has only to create the quality information on the whole musical piece contents.

Based on a result of detection by a noise detector, controller 80 deletes, from musical piece content storage unit 91, the musical piece content having the highest noise out of the multiple musical piece contents matching each other.

(Outline of Musical Piece Content Deletion Process)

Figure 19:
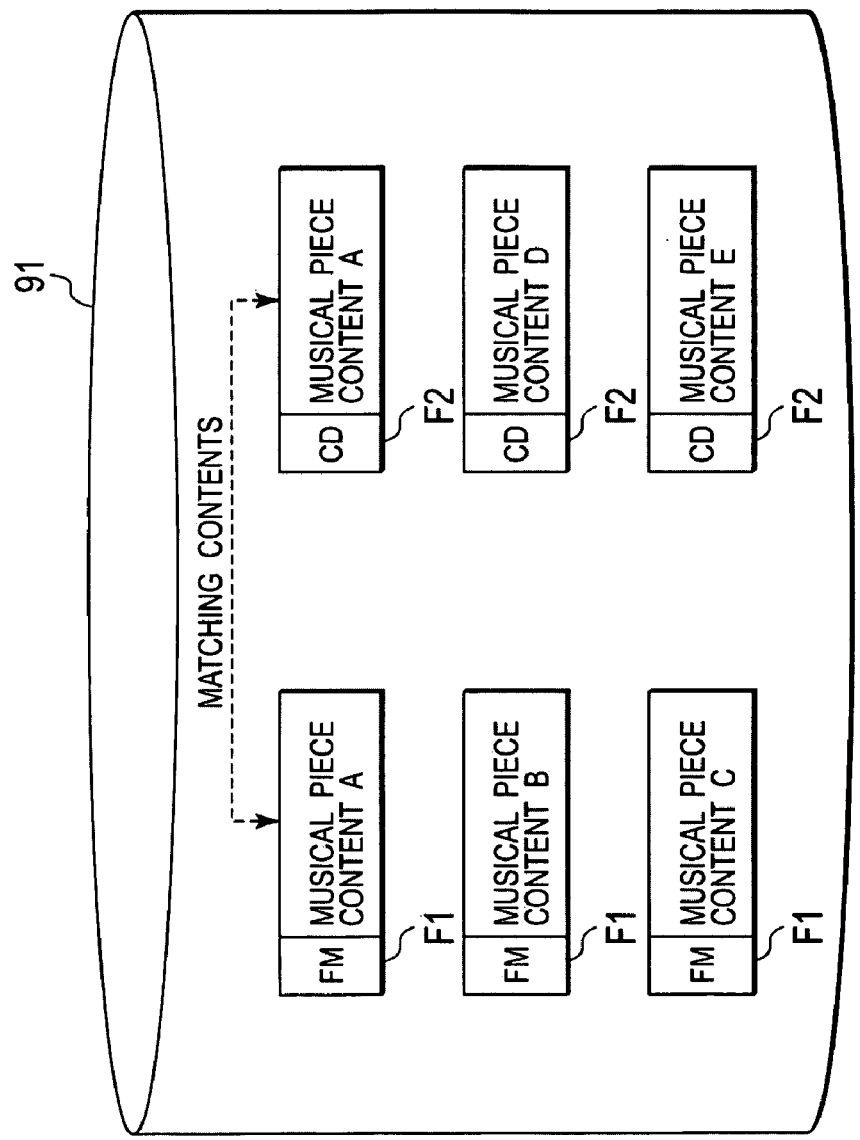
FIG. 19 is a view showing an example of musical piece contents to be recorded in a musical piece content storage unit according to the second embodiment.

FIG. 19 is a view showing an example of the musical piece contents recorded in musical piece content storage unit 91. In the following description, the musical piece contents to be recorded in musical piece content storage unit 91 are assumed to include the musical piece contents that are automatically extracted from the FM radio broadcast and the musical piece contents that are acquired from CD/DVD 104.

In the example shown in FIG. 19, musical piece contents A, B, and C that are automatically extracted from the FM radio broadcast and musical piece contents A, D, and E that are acquired from CD/DVD 104 are recorded in musical piece content storage unit 91.

FM record flag F1 is attached to headers of the respective musical piece contents A, B, and C that are automatically extracted from the FM radio broadcast. Meanwhile, purchase flag F2 is attached to headers of the respective musical piece contents A, D, and E that are acquired from CD/DVD 104.

In this case, matching judging unit 81 detects an overlap of the musical piece content A, which has been automatically extracted from the FM radio broadcast, with the musical piece content A, which has been acquired from CD/DVD 104. Then, identification information judging unit 87 judges that the FM record flag F1 and the purchase flag F2 are respectively attached to the overlapping musical piece contents A.

As described previously, the musical piece content A acquired form CD/DVD 104 has higher quality than the musical piece content A automatically extracted from the FM radio broadcast. Accordingly, in the example shown in FIG. 19, controller 80 deletes, from musical piece content storage unit 91, the musical piece content A automatically extracted from the FM radio broadcast.

(Example of Musical Piece Content Deletion Process Flow)

Figure 20:
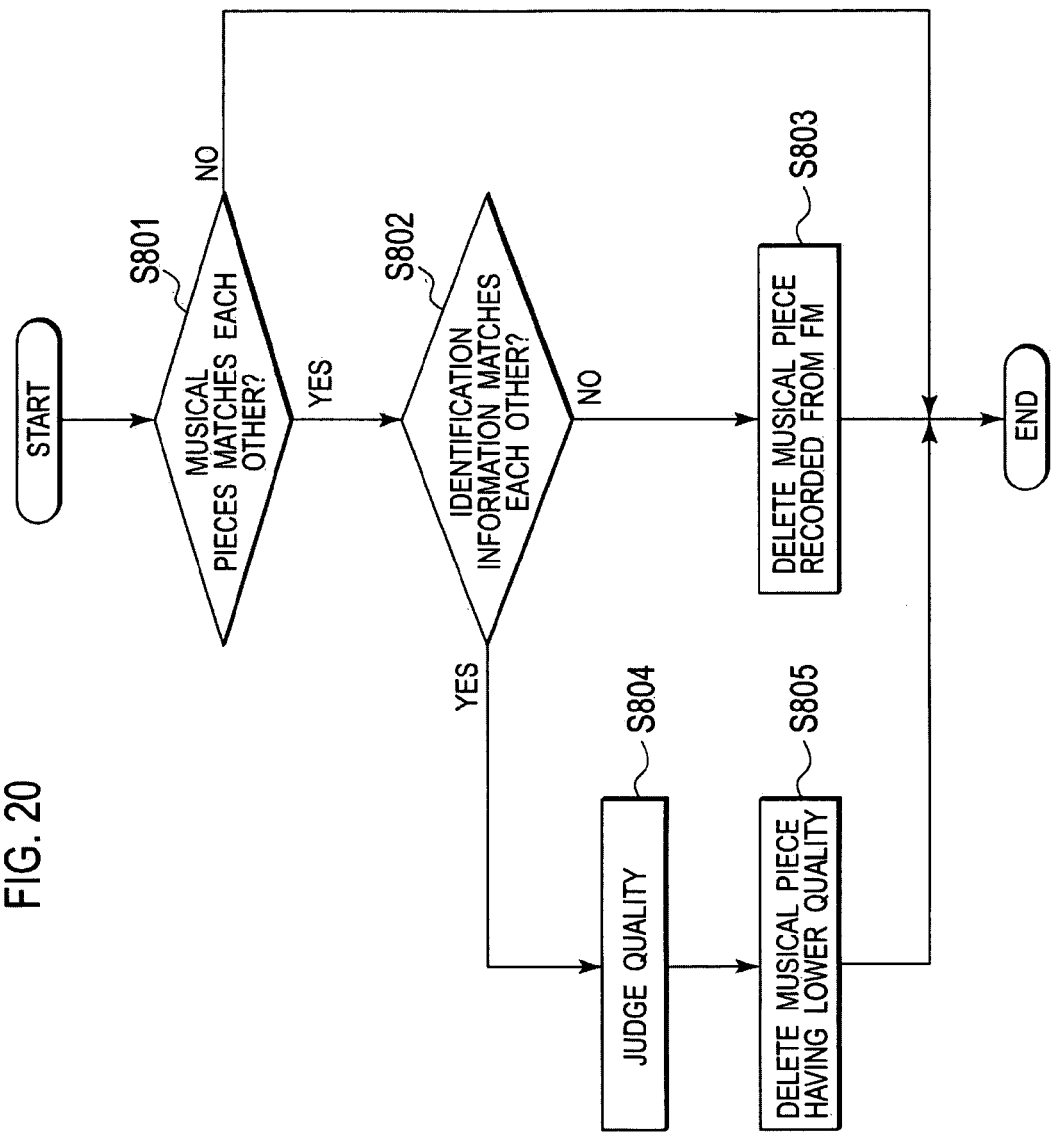
FIG. 20 is a flowchart showing a process flow of a musical piece content deletion process to be executed by the musical piece recording and playing device according to the second embodiment.

FIG. 20 is a flowchart showing a process flow of a musical piece content deletion process.

In Step S801, matching judging unit 81 judges whether multiple musical piece contents that recorded in musical piece content storage unit 91 match each other using the cut point information. Here, matching judging unit 81 detects two musical piece contents matching each other.

In Step S802, identification information judging unit 87 judges whether the same identification information (flags) is attached to the two musical piece contents that are detected by matching judging unit 81.

The process goes to Step S803 when different types of identification information (flags) are attached to two the musical piece contents detected by matching judging unit 81.

In Step S803, controller 80 deletes, from musical piece content storage unit 91, the musical piece content attached with the FM record flag out of the musical piece contents detected by matching judging unit 81.

Meanwhile, the process goes to Step S804 when the same identification information (flags) is attached to the two musical piece contents detected by matching judging unit 81.

In Step S804, quality judging unit 72 detects noise contained in the two musical piece contents that are detected by matching judging unit 81.

In Step S805, controller 80 deletes, from musical piece content storage unit 91, the musical piece content having lower quality, i.e. higher noise, out of the two musical piece contents matching each other.

According to this embodiment, when the multiple contents of the same musical piece are recorded in musical piece content storage unit 91, musical piece recording and playing device 200 can save, into musical piece content storage unit 91 (HDD 9), the musical piece content acquired from the recording medium (CD/DVD 104 or memory card 105) or from musical piece content distribution server 102 in preference to the musical piece content acquired from the FM broadcast signal.

In other words, musical piece content storage unit 91 (HDD 9) can save the musical piece content having higher quality by deleting the musical piece content having lower quality (sound quality). For this reason, it is possible to make effective use of the storage capacity of musical piece content storage unit 91 (HDD 9).

According to this embodiment, when the same flags are attached to the multiple musical piece contents that match each other, quality judging unit 72 detects noises contained in each of the multiple musical piece contents matching each other. Controller 80 deletes the musical piece content containing higher noise out of the multiple musical piece contents matching each other on the basis of the result of noise detection.

Accordingly, musical piece recording and playing device 200 can save, into musical piece content storage unit 91 (HDD 9), the musical piece content having less noise when the multiple musical piece contents have been acquired from the similar acquisition source. Accordingly, the musical piece content having higher quality can be saved into musical piece content storage unit 91 (HDD 9). In this way, it is possible to reduce a processing load required for matching of the musical piece contents, and to delete the musical piece content having lower quality out of the multiple musical piece contents matching each other, thereby allowing effective use of the storage capacity of musical piece contents storage unit 91.

Other Embodiments

The present invention has been described above with reference to certain embodiments. However, it is to be understood that the description and the drawings constituting part of this disclosure will not limit the scope of this invention. It is obvious for those skilled in the art that various other embodiments, examples, and technical applications are possible from this disclosure.

Figure 21:
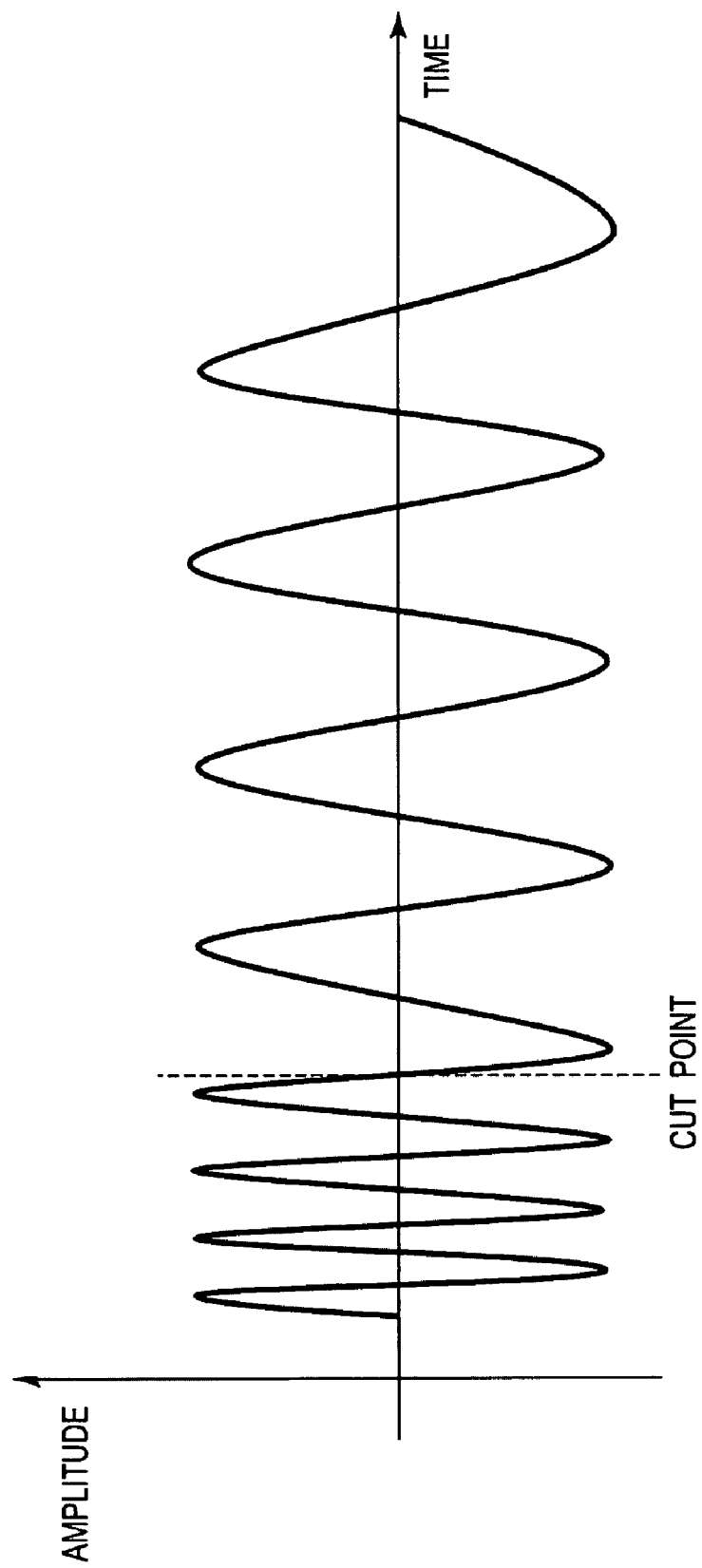
FIG. 21 is a waveform chart for explaining a cut point detecting operation according to another embodiment.

For example, the first and second embodiments describe the case of using the amount of change per unit time of the power of the audio signal as the characteristic amount of the musical piece content. As another embodiment, as shown in FIG. 21, it is also possible to use an amount of change per unit time of a frequency of the audio signal as the characteristic amount of the musical piece content.

Moreover, the first embodiment describes the example of the musical piece recording and playing device configured to record musical piece contents by receiving radio broadcast. Instead, the musical piece recording and playing device may also be configured to receive broadcast using a communication network such as the Internet or to record and play musical piece contents read out of CDs and the like.

Further, the first embodiment describes the example of combining two musical piece contents. However, the present invention is also applicable to a case of combining three or more musical piece contents. When combining three or more musical piece contents, it is possible to create a musical piece content having higher quality than the case of combining two musical piece contents.

In the above-described second embodiment, cut point detector 71 is configured to detect the cut points from each of the musical piece contents stored in musical piece content storage unit 91. However, as described earlier in the first embodiment, the cut points are detected at the time of extraction of the musical piece contents in the case of the musical piece contents that are extracted from the FM broadcast signal. The information on the cut points thus detected is stored in cut point information storage unit 92. Consequently, cut point detector 71 may curtail detection of the cut points in terms of the musical piece component extracted from the FM broadcast signal, i.e. the musical piece content attached with the FM record flag, and may acquire the information on the cut points stored in cut point information storage unit 92 instead. Meanwhile, in the case of extracting the musical piece content by using the cut points, musical piece content extractor 70, like cut point detector 70, detects the cut points by means of comparing the characteristic amount with the threshold. Here, musical piece content extractor 70 has only to detect a minimum number of cut points necessary for extracting the musical piece contents. For this reason, the threshold used by musical piece content extractor 70 may be greater than the threshold used by cut point detector 71.

Although the embodiments describe the case of using the HDD for storing the musical piece contents and the like, it is also possible to use a semiconductor device such as a flash memory instead of the HDD.

Meanwhile, the embodiments describe the case of using MP3 as the compression coding method for the musical piece contents. However, it is also possible to apply other compression coding methods.

Further, it is possible to implement the respective process flows described in the first and second embodiments into a computer program so as to cause a personal computer (PC) or the like to execute such a program.

As described above, it is to be noted that the present invention encompasses various other embodiments and modifications not expressly stated herein. In this context, the present invention shall only be limited by the matter to define the invention to be reasonably understood from this disclosure and defined by the appended claims.

What is claimed is:

1. A musical piece matching judging device comprising:
a cut point detector configured to calculate a characteristic amount from a plurality of musical piece contents, and to detect, as a cut point, a time point when the characteristic amount exceeds a threshold;
a cut point information storage unit configured to store information on the cut point concerning each of the plurality of musical piece contents; and
a matching judging unit configured to judge whether the plurality of musical piece contents match each other, based on the stored information on the cut point.

2. The device of claim 1,
wherein the cut point detector calculates, as the characteristic amount, an amount of change per unit time of power of an audio signal.

3. The device of claim 2,
wherein the cut point detector calculates an amplitude spectrum from the audio signal of the musical piece content, and calculates the amount of change per unit time of the power of the audio signal by using the amplitude spectrum.

4. The device of claim 1,
wherein the cut point detector calculates an amount of change per unit time of a frequency of an audio signal as the characteristic amount.

5. The device of claim 1,
wherein the matching judging unit judges, based on the number of the cut points of each of the musical piece contents, whether the plurality of musical piece contents match each other.

6. The device of claim 1,
wherein the matching judging unit judges, based on time intervals between the cut points of each of the musical piece contents, whether the plurality of musical piece contents match each other.

7. A musical piece matching judging method comprising:
calculating characteristic amounts from each of a plurality of musical piece contents, and detecting, as cut points, time points when the characteristic amounts exceed a threshold;
storing information on the cut point concerning each of the plurality of musical piece contents; and
judging, based on the stored information on the cut point, whether the plurality of musical piece contents match each other.

8. A musical piece matching judging program comprising:
a program module that calculates characteristic amounts from each of a plurality of musical piece contents, and detects, as cut points, time points when the characteristic amounts exceed a threshold;
a program module that stores information on the cut points concerning each of the plurality of musical piece contents; and
a program module that judges, based on the stored information on the cut point, whether the plurality of musical piece contents match each other.

9. The program of claim 8,
wherein the program module that calculates characteristic amounts from each of a plurality of musical piece contents, and detects, as cut points, time points when the characteristic amounts exceed a threshold includes a program module that calculates, as the characteristic amount, an amount of change per unit time of power of an audio signal.

* * * * *